United States Patent
Blanc

(10) Patent No.: US 7,850,415 B2
(45) Date of Patent: Dec. 14, 2010

(54) MACHINE FOR PALLETIZING OBJECTS SUCH AS PACKING CASES

(75) Inventor: Philippe Blanc, Montauban (FR)

(73) Assignee: Materiel pour l'Arboriculture Fruitiere, Montauban (FR)

(*) Notice: Subject to any disclaimer, the term of this patent is extended or adjusted under 35 U.S.C. 154(b) by 1127 days.

(21) Appl. No.: 11/140,245

(22) Filed: May 31, 2005

(65) Prior Publication Data

US 2005/0265817 A1    Dec. 1, 2005

(30) Foreign Application Priority Data

May 28, 2004 (FR) .................................. 04 05798

(51) Int. Cl.
*B65G 57/22* (2006.01)
(52) U.S. Cl. ................. 414/791.6; 414/799; 414/792.6; 414/791.1
(58) Field of Classification Search .............. 414/793.4, 414/792.6
See application file for complete search history.

(56) References Cited

U.S. PATENT DOCUMENTS

| | | | |
|---|---|---|---|
| 3,648,857 A | 3/1972 | Grasvoll | |
| 4,067,456 A | 1/1978 | Schmitt | |
| 4,927,318 A * | 5/1990 | Hayden et al. | ............... 414/802 |
| 5,540,545 A * | 7/1996 | Roberts et al. | ............ 414/792.6 |
| 2005/0265816 A1* | 12/2005 | Blanc | .......................... 414/799 |

FOREIGN PATENT DOCUMENTS

| | | |
|---|---|---|
| DE | 44 12 830 | 10/1995 |
| EP | 1 321 396 | 6/2003 |
| ES | 473577 | 4/1979 |
| FR | 2 401 858 | 3/1979 |
| FR | 2 696 711 | 4/1994 |
| SU | 816915 | 3/1981 |
| SU | 1105428 | 7/1984 |
| SU | 1127827 | 12/1984 |

* cited by examiner

*Primary Examiner*—Gregory W Adams
(74) *Attorney, Agent, or Firm*—Young & Thompson

(57) ABSTRACT

A machine for palletizing substantially parallelepipedic objects such as packing cases, comprising a grouping station for forming objects into a group able to form a layer of a palletized load, which grouping station includes a fixed reference stop adapted to stop an object conveyed thereto by an abutment conveyor; a layer-forming surface extending laterally opposite to the reference stop; a motorized thruster adapted to displace the object located against the reference stop to a predetermined zone of the layer-forming surface corresponding to the position it is to occupy in the layer being formed; and an automatic control system adapted to control the drive means so as to position laterally opposite the reference stop a zone of the layer-forming surface which is to receive the object located against the reference stop, and to control of the thruster so as to displace the object onto that zone of the layer-forming surface.

11 Claims, 21 Drawing Sheets

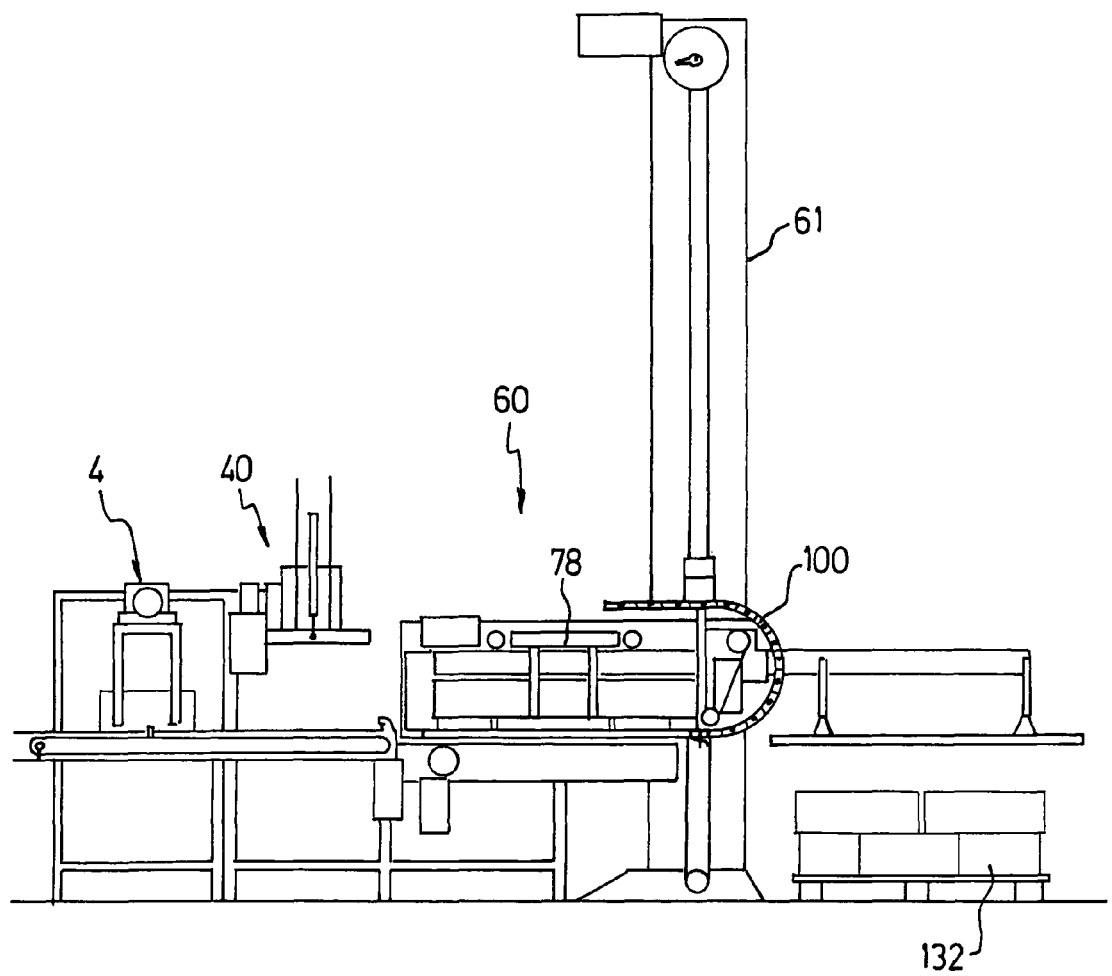

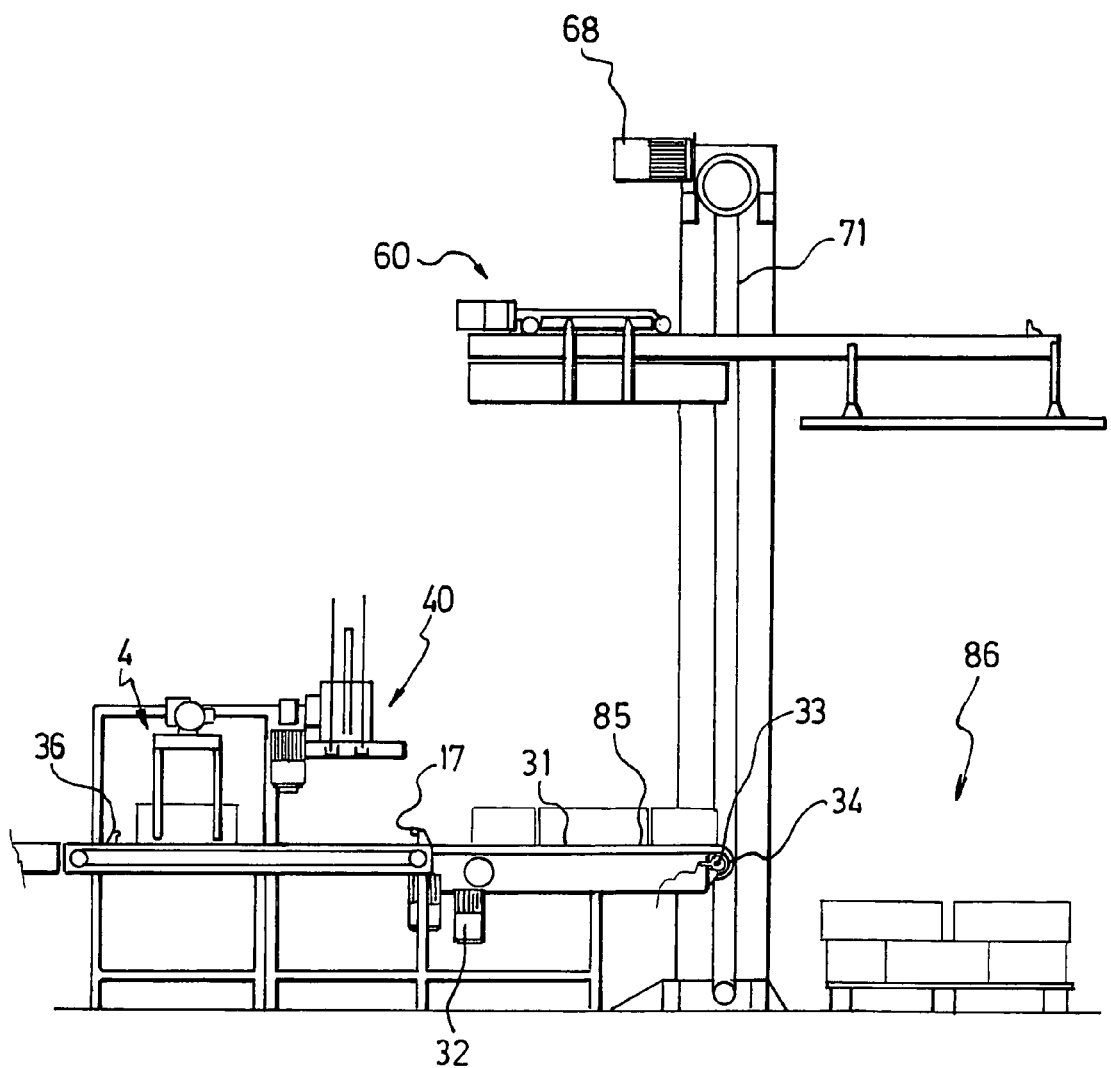

MACHINE FOR PALLETIZING OBJECTS SUCH AS PACKING CASES

The invention relates to a machine for palletizing substantially parallelepipedic objects such as packing cases, comprising:
- at least one conveyor for feeding objects successively one by one,
- a station for orienting each object in a horizontal plane with respect to a fixed horizontal direction,
- a grouping station for forming objects into a group able to form a layer of a palletized load comprising a stack of layers of objects, said grouping station being adapted to place each object supplied by the feed conveyor in a position it is to occupy in the formation of a layer,
- a layer-stacking unit adapted to transport in a single block each layer previously formed at the grouping station on to a palletized load in the course of formation by a stacking of layers.

The known machines of this type prove satisfactory, but are complex and expensive with regard to manufacture and maintenance.

In particular, the placing of each object in the position it is to occupy necessitates the use of motorized rollers and/or retractable stops and/or chain mechanisms, and delicate control systems liable to wear, representing a large number of moving parts, the control logic of which is relatively complicated. In particular, the modification of the machine according to each shape and/or dimension of the objects and/or the layers is long and complex. It necessitates mechanical dismantling and reassembly. In addition, the known machines have a large space requirement with regard to length and volume.

Palletizing robots comprising a hand for gripping objects arriving on a feed conveyor, a pivoted arm sliding vertically on a vertical support column, and a programmed automatic control system for automatically placing and stacking the objects grasped by the hand on at least one pallet are also known.

Such robots require complex mechanical and control elements, and similarly complex programming of the movements and actions of each element. They are extremely costly and are reserved for intensive use for large-volume production in relatively clean environments. They cannot be envisioned when investment budgets are limited, in particular, in the case of discontinuous—for example, seasonal—use of the machine. In particular, they are not compatible with use in the context of farming, for example, for packing fruit in cases grouped into palletized loads.

In this context, it is an object of the invention to mitigate these disadvantages by proposing a palletizing machine which is greatly simplified with regard to manufacture and is inexpensive in terms of use and maintenance.

It is also an object of the invention to propose such a machine which has increased reliability and service life and is able to withstand a contaminated, humid or aggressive environment such as that encountered in farming.

It is also an object of the invention to propose such a machine which is compatible with diverse types of objects (cases, small boxes, fruit baskets, cardboard trays, etc.), which can be instantly adjusted according to the shapes and/or dimensions of the objects to be palletized and does not require any mechanical dismantling or assembly.

It is also an object of the invention to propose such a machine which is compact and has a small space requirement, in particular with regard to length and height.

It is also an object of the invention to propose such a machine which is compatible with the economic constraints associated with discontinuous use of the machine, for example, in the context of farming.

To achieve these objects, the invention relates to a machine as mentioned above wherein the grouping station comprises:
- a stop, called the reference stop, firmly mounted on a fixed structure and able to stop an object in a horizontal transverse abutment direction,
- a conveyor for placing an object to be positioned in abutment against the reference stop,
- a layer-forming surface extending laterally opposite the reference stop, said layer-forming surface being movable in horizontal translation along an axis orthogonal to the direction of the reference stop under the effect of driving means,
- a motorized thruster able to displace the object located against the reference stop to a predetermined zone of the layer-forming surface corresponding to the position it is to occupy in the layer in the course of formation,
- an automatic control system adapted to control said drive means so as to position laterally opposite the reference stop a zone of the layer-forming surface which is to receive the object located against the reference stop, and to control the thruster so that said object is displaced to said zone of the layer-forming surface.

Such a grouping station is extremely simple both as regards the mechanical elements composing it (barrier, movable forming surface, motorized thruster) and in terms of programming. It avoids all mechanical adjustment regarding the configuration of the layers to be produced and/or the shapes and/or dimensions of the objects. It has a small space requirement and is compact, inexpensive, flexible, reliable and robust, and withstands soiled, humid and aggressive environments.

In a first advantageous variant according to the invention, the layer-forming surface includes a table mounted on a fixed structure so as to be able to be displaced in horizontal translation in one direction or the other and to be held fixed in position after being displaced.

In a second advantageous variant according to the invention, the layer-forming surface includes an endless belt conveyor movable in horizontal translation.

In addition, according to the invention the layer-forming surface advantageously extends horizontally at least substantially at the height of—i.e. at the same height as or slightly below—the abutment conveyor, and the motorized thruster is mounted to be movable in horizontal translation with respect to the fixed structure parallel to the direction of the reference stop.

According to the invention, the thruster is advantageously carried and guided by a slide extending above the abutment conveyor and the layer-forming surface, at a height greater than that of the objects to be grouped.

According to the invention, the automatic control system is advantageously adapted to control the thruster in such a way that the latter pushes a plurality of objects located in abutment against one another and against the reference stop. For this purpose the automatic control system allows said plurality of objects to accumulate against the reference stop and against one another before activating the thruster.

According to the invention, the thruster is advantageously adapted to displace simultaneously a number of objects smaller than that of a row of a layer of the palletized load (the row being formed on the layer-forming surface orthogonally to the direction of the reference stop). According to the invention, the thruster and the automatic control system are advantageously adapted to displace either a single object located against the reference stop or two objects, one of which is against the reference stop and the other is in abutment against the first.

In addition, according to the invention the orientation station advantageously includes a gripper able to grasp each object by two opposed vertical faces of the object and to pivot the object on itself about a vertical axis so as to subject it, after being grasped by the gripper, to a rotation through an angle equal to a multiple of 90° in one direction or the other.

According to the invention, the gripper is advantageously mounted on a support arranged above the feed conveyor at a height greater than that of the objects, and has two opposed jaws which are spaced apart at rest, before grasping an object, by a distance greater than the largest horizontal dimension of the objects, i.e. their horizontal diagonal.

Furthermore, according to the invention the layer-stacking unit advantageously includes a device for gripping in one block a layer previously formed on the layer-forming surface, and means for displacing the gripping device in vertical translation for raising/lowering a layer, and in horizontal translation for transporting the layer held by the gripping device from the layer-forming surface to a position plumb with respect to a pallet or a palletized load in the course of formation.

In addition, according to the invention the layer-stacking unit advantageously includes a device for re-centering and alignment by simultaneous clamping of the sides of the last stacked layer of the palletized load which is to receive the transported layer.

The invention also relates to a machine wherein there are provided in combination all or some of the characteristics mentioned hereinbefore or hereinafter.

Other objects, characteristics and advantages of the invention will be apparent from the following description with reference to the appended drawings illustrating embodiments of the invention which are given by way of non-limiting examples, in which drawings:

FIGS. 7a to 7e are schematic side views illustrating different successive steps of a transfer of a layer by the layer-stacking unit from the layer-forming table to the palletized load being formed, with a machine according to the first embodiment of the invention.

FIG. 9 is a schematic side view of the machine of FIG. 8;

Figure 1:
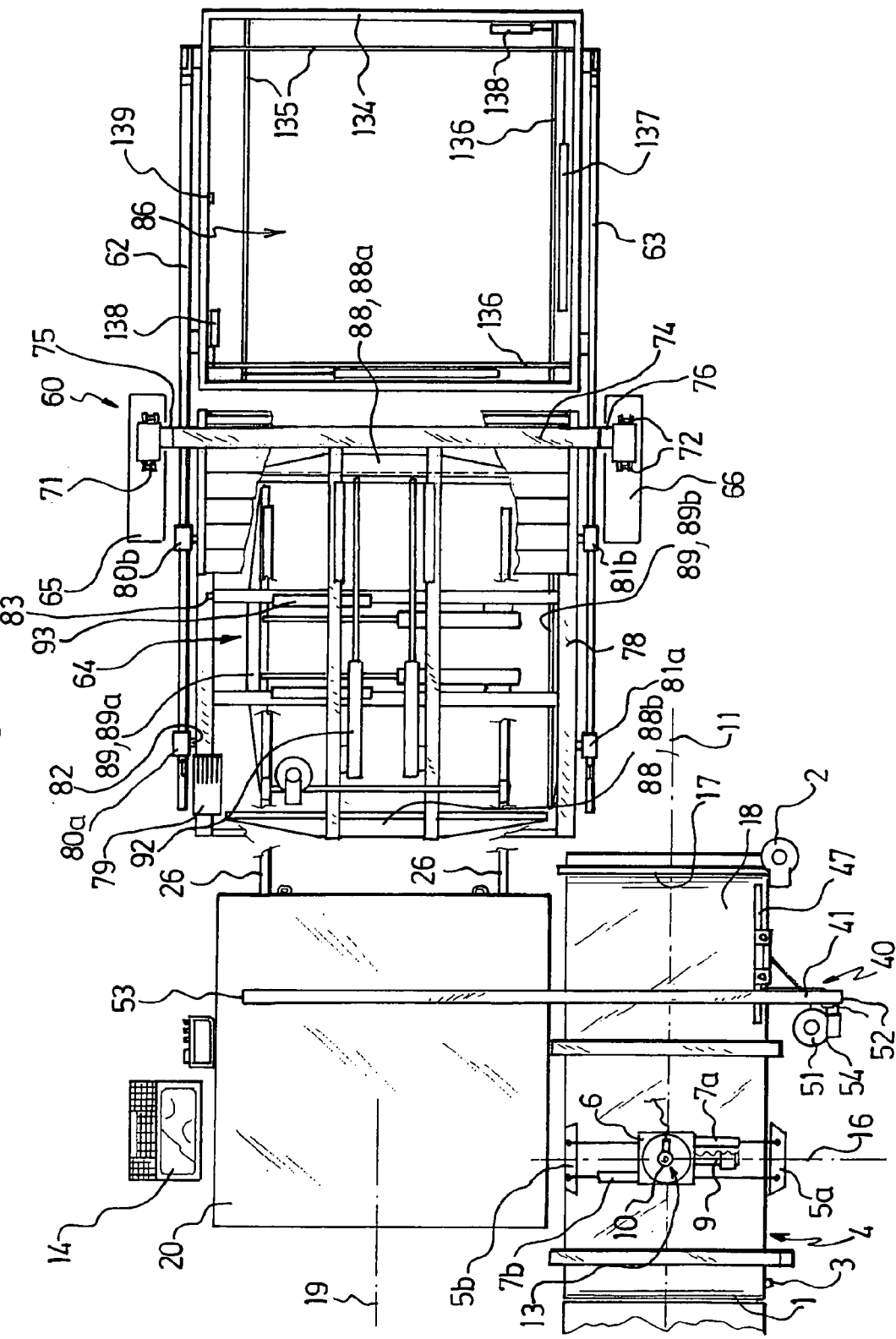
FIG. 1 is a schematic top view of a machine according to a first embodiment of the invention.

In the drawings the same structural or functional elements are designated by the same references.

The machine according to the invention shown in the drawings includes a feed conveyor 1 having an endless belt 15 driven by an electric motor 2 and associated with a rotary encoder 3 registering the position and the displacements of the belt 15 along an axis of movement 11 of said belt 15.

At the entrance to the feed conveyor 1 there is provided an orientation station 4 enabling each object to be pivoted about a vertical axis in order, firstly, to orient it in a horizontal direction that it must take in a layer to be formed and, secondly, if applicable, to cause a label it carries to face towards the outside of the layer in which it will subsequently be placed.

The orientation station 4 includes a gripper with two jaws 5a, 5b which have parallel vertical clamping faces and are mounted to slide horizontally simultaneously in opposite directions along an axis 16 perpendicular to their faces on a support 6 having actuators 7a, 7b for controlling said jaws 5a, 5b. The support 6 is itself mounted rotatably about a vertical axis 13, median with respect to the jaws 5a, 5b, on a fixed structure 8, at a height with respect to the support surface (belt 15) of the feed conveyor 1 that is greater than the maximum height of the objects to be grouped. The support 6 is driven by a motor 9 and is associated with an angle encoder 10 permitting the position of the gripper 5a, 5b with respect to the axis of movement 11 of the feed conveyor 1 to be registered.

Initially, the jaws 5a, 5b are moved horizontally apart by a distance greater than the largest horizontal dimension (horizontal diagonal) of the objects, so as to be able to rotate freely around an object arriving in the gripper.

The structure 8 carries a fixed photoelectric cell 12 having an axis transverse to the axis 11 of the conveyor 1 and located in the vertical plane of the pivot axis 13 of the gripper 5a, 5b. The cell 12 detects the arrival of an object at the orientation station 4, triggering the reading of the position of the encoder 3 of the conveyor 1 by a control unit 14 of the machine. The control unit 14 is formed in conventional manner by a data-processing unit programmed to effect automated digital control of the various elements of the machine according to the invention. The position of the encoder 3 upon arrival of the object in the gripper 5a, 5b constitutes an initial reference for the position of the belt 15 of the conveyor 1. On the basis of this reading the belt 15 is moved in translation by a value corresponding to a half-length of the object along the axis 11, so as to center said object in the gripper 5a, 5b. The motor of the belt 15 is then stopped during the operation of orienting the object.

The control unit 14 can control the motor 9 to pivot the gripper 5a, 5b through an angle of +90°, −90° or 180°, before or after clamping of the jaws 5a, 5b, depending on the pivoting of the object to be effected.

Initially, the axis 16 of the gripper 5a, 5b is orthogonal to that 11 of the belt 15.

The value of the angle of pivot to be effected for each object is predetermined and recorded in the control unit 14 for all the objects passing successively into the gripper 5a, 5b and which are to constitute a group forming a layer of the palletized load to be produced. These values may be recorded in the form of a table for each group of objects and determined according to the orientation to be given to each of the objects in the layer.

Once the orientation operation has been carried out, the motor 2 of the belt 15 is set in motion to move the object downstream until it abuts a transverse reference stop 17 arranged at a downstream end 18 of the conveyor 1. This stop 17 may be formed, for example, by a bar extending orthogonally to the axis 11 of the conveyor 1 and adapted to stop the objects at the downstream end 18 in a horizontal transverse abutment direction corresponding to the direction defined by the bar.

The feed conveyor 1 therefore also constitutes a conveyor for bringing the objects into abutment against the stop 17. In a variant (not shown), two separate conveyors might be provided.

A layer-forming surface 20, 30 adjoins the abutment conveyor 1 on one side of the latter, and is movable in horizontal translation along an axis 19 parallel to that 11 of the conveyor and orthogonal to the abutment direction defined by the reference stop 17. The layer-forming surface 20, 30 is located substantially at the level of the belt 15 of the conveyor 1 and laterally opposite the reference stop 17, so that the objects moving into abutment against the stop 17 can be transferred on to a zone of the layer-forming surface 20, 30 located laterally opposite the stop 17 and adjacent to the belt 15 of the conveyor 1.

In the first embodiment, shown in FIGS. 1 to 5, 6a to 6f and 7a to 7e, the layer-forming surface is formed by a movable table 20 mounted and guided in horizontal translation on rails 26 of a fixed structure 21 by means of a rack 22 associated with the table 20 and drive pinions 23 coupled to an electric motor 24. A rotary encoder 25 associated with the shaft 27 of a pinion 23 allows the displacements of the movable table 20 in horizontal translation on the structure 21 to be measured. An inductive sensor 28 fixed to the structure 21 allows an initial position of the table 20 with respect to the structure 21 to be registered when a metal marker 29 fixed to the table 20 moves opposite the sensor 28.

The encoder 25, the sensor 28, and the motor 24 are connected to the control unit 14 to control the displacement and maintenance of the position of the table 20 by the motor 24.

In the second embodiment, shown in FIGS. 8, 9, 10a to 10e and 11a to 11c, the layer-forming surface is formed by a conveyor 30 having an endless belt 31 driven by an electric motor 32 and provided with an encoder 33 for measuring the displacements in horizontal translation of the belt 31 along the axis 19. The conveyor 30 is positioned laterally opposite the reference stop 17 and extends longitudinally in both directions between two end rollers 34, 35, having a length greater than that of the longest layer of objects to be formed. An upstream transverse stop 36 is fixed to the structure beyond and parallel to the end roller 35 to allow the objects present on the belt 31 to accumulate in the longitudinal direction 19 through abutment against said stop 36.

The machine also includes a transfer device 40 able to transfer the object(s) which are in abutment against the reference stop 17 on to the layer-forming surface 20, 30. The transfer device 40 includes an upper transverse slide 41 extending above the abutment conveyor 1 and the layer-forming surface 20, 30 orthogonally to the horizontal axes 11, 19 and to the vertical axis 13 (and parallel to the direction of the reference stop 17), and forming a running rail of a sliding support 42 provided with rollers 43 running in the slide 41. The support 42 is cantilevered beside the slide 41 and carries a vertical actuator 44 the actuating rod 45 of which has at its lower free end 46 a thruster 47 adapted to bear against the lateral surface of an object or a plurality of objects located against the stop 17 and to push it/them towards the layer-forming surface 20, 30 opposite when the support 42 is driven in translation in the slide 41.

The slide 41 includes a toothed belt 48 extending between two end pulleys 49, 50, one of which 49 is driven by an electric motor 51. Abutment stops 55, 56 are fixed to each end 52, 53 of the slide 41 to limit the movements of the support 42 at each corresponding end 52, 53. An encoder 54 is associated with the shaft of the motor 51 to measure the displacement travel of the support 42 in the slide 41. The actuator 44 and the motor 51 are controlled by the control unit 14 in each transfer cycle. In the starting position, the rod 45 of the actuator 44 is lowered, the support 42 being at the end 52 of the slide 41 located at the abutment conveyor 1, and the thruster 47 being positioned against one or more objects to be transferred. The motor 51 is activated to transfer the object(s) on to the layer-forming surface 20, 30. The actuator 44 is then activated to raise the thruster 47 to a height above the objects, then the motor 51 is activated to return the support 42 to the starting position.

The control unit 14 is programmed to control the movements of the conveyor 1, the orientation station 4, the transfer device 40 and the layer-forming surface 20, 30 so as to carry out the grouping of objects in one layer at a time on the layer-forming surface 20, 30. The reference stop 17, the conveyor 1 which moves the objects successively against the stop 17, the transfer device 40, and the layer-forming surface 20, 30 therefore form, with the control unit 14, a grouping station for forming objects into groups each of which is able to form a layer of the palletized load on the layer-forming surface 20, 30.

Furthermore, there is provided downstream of the layer-forming surface 20, 30 a layer-stacking unit 60 designed to be able to grasp in a single block each layer successively formed on the layer-forming surface 20, 30, to transport this layer in a single block on to a palletized load (i.e. on to an empty pallet in the case of the first layer, or on to a lower layer previously positioned in the alternative case) in the process of being formed by a stacking of layers.

The layer-stacking unit 60 includes a vertical gantry 61 of a height greater than that of the highest palletized load to be formed, carrying two horizontal side-members 62, 63 for supporting and guiding in horizontal translation a layer-gripping device 64. The gantry 61 comprises two vertical posts 65, 66 and an upper end cross-beam 67 connecting them.

The two side-members 62, 63 are guided in sliding vertical translation with respect to the posts 65, 66 of the gantry 61. They are driven simultaneously in their vertical translation movements by an electric motor 68 carried by the cross-beam 67 and driving two sprockets having a horizontal axis carried respectively by the upper ends of each of the two posts 65, 66. Each sprocket drives a chain 71, 72 fixed respectively to the corresponding side-member 62, 63. Thus, the two side-members 62, 63 are always at the same height and can rise or descend simultaneously along the gantry 61. Preferably, the two side members 62, 63 form part of the same machine-welded support structure 73 guided vertically along the posts 65, 66. This support structure 73 advantageously includes, in particular, one or more upper cross-beams and, in particular, an upper median cross-beam 74 joining two posts 75, 76 fixed to the side members 62, 63 respectively. A rotary encoder 77 is associated with the motor 68 or with one of the sprockets and connected to the control unit 14 to measure the vertical displacements of the support structure 73.

The layer-gripping device 64 comprises a machine-welded chassis 78 guided in horizontal translation on and between the two side-members 62, 63. For this purpose the chassis 78 has four rollers 80a, 80b, 81a, 81b running on the side-members 62, 63. The chassis 78 is driven in translation by an electric motor 79 coupled to a transverse shaft 82 driving two rollers 80a, 81a. End stops are provided at each end of the side-members 62, 63. In addition, the chassis 78 carries at least one photoelectric cell 83 connected to the control unit 14 and enabling the horizontal position of the chassis 78 with respect to the side-members 62, 63 to be registered, at least one of the latter carrying markers 84 for this purpose. These markers may be formed by reflective plates. They enable the position of the chassis 78 to be registered in order to move it either to the position for gripping a layer above the layer-forming surface 20, 30, or to the layer-stacking position above the palletized load disposed on the other side of the gantry 61.

The gantry 61 is therefore so arranged with respect to the layer-forming surface 20, 30 that the side-members 62, 63 extend on one side of the gantry 61 above the layer-forming surface 20, 30, at least above a downstream portion 85 of this layer-forming surface 20, 30 to which a formed layer may be moved so that it can be grasped by the gripping device 64. The side-members 62, 63 extend opposite to the layer-forming surface 20, 30 with respect to the gantry 61 so that they are disposed above a zone 86 where a palletized load can be formed.

The layer-stacking unit 60 therefore enables each previously formed layer to be displaced in vertical translation and in horizontal translation parallel to the axes 11, 19 of the feed conveyor 1 and of the layer-forming surface 20, 30. It can therefore do without an element rotatable in space.

The chassis 78 also carries two pairs 88, 89 of clamping jaws 88*a*, 88*b*, 89*a*, 89*b* for bilateral clamping of the sides of the layer and designed to clamp the four sides of the gripped layer horizontally towards one another between these jaws. The first pair 88 of jaws 88*a*, 88*b* has vertical faces orthogonal to the axis 19 of the layer-forming surface 20 and to the direction of horizontal translation of the chassis 78. The second pair 89 of jaws 89*a*, 89*b* has vertical faces orthogonal to those of the first pair 88, i.e. parallel to the axis 19 of the layer-forming surface 20 and to the direction of horizontal translation of the chassis 78.

Each pair 88, 89 of jaws is moved by at least one actuator 92, 93 respectively, controlled by the control unit 14. Preferably, one 88*a*, 89*a* of the jaws is movable with a long travel and the other 88*b*, 89*b* is movable with a shorter travel with respect to the chassis 78. This facilitates movement of the jaws 88, 89 around the layer of objects. The two jaws 88*b*, 89*b* are orthogonal and define a reference corner for positioning the layer which may coincide with a reference corner for positioning the palletized load on the zone 86. The pairs 88, 89 of jaws form a frame for retaining the layer laterally. The clamping imparted by the jaws under the effect of the actuators 92, 93 may be adapted not only to realign and re-center the objects into a perfectly rectangular layer, but also to allow the objects thus clamped horizontally against one another between the jaws to be transported.

However, according to the invention the layer-gripping device 64 advantageously includes a retractable base 100 for supporting objects of the layer transported, carried by the movable chassis 78 and designed to be able to be deployed horizontally under the objects of the layer to be transported when this layer and the layer-forming surface 20, 30 are disengaged from one another by relative displacement. This retractable base 100 is also designed to be able to be subsequently retracted, allowing the objects of the transported layer that it supports to fall on to the palletized load to form a new layer of this palletized load.

This retractable base may be formed by a curtain 100 having a horizontal profile, guided by lateral guide rails 102 and having a horizontal lower section 120 extending horizontally in the lower portion of, and on each side of, the chassis 78 under the pairs 88, 89 of jaws, starting from free ends 103 of the rails 102. The rails 102 extend horizontally parallel to the direction of displacement of the chassis 78, then upwardly to form a curved downstream section 118 passing around the chassis 78 and above the pairs 88, 89 of jaws and, in the example illustrated, return in the opposite horizontal direction to form an upper horizontal section 119 which receives the curtain 100 in the retracted position. It should be noted that in a variant the rails 102 may extend beyond the curved section 118, vertically or in an inclined disposition between the vertical and the horizontal section illustrated.

The curtain 100 is formed, for example, by a plurality of rectangular battens 106 articulated to one another two-by-two along their adjacent longitudinal edges and extending between the two side rails 102. Each batten 106 has at each of its ends a small wheel 107 running freely in the corresponding rail 102. As a variant or in combination, such a small wheel may be mounted at the end of a spindle articulating a pair of adjacent battens.

The first upstream end batten 108 is designed to move level with the ends 103 of the rails 102 when the curtain 100 is deployed. The curtain 100 is connected on each side (i.e. at each of its ends) to a lateral cable 109 attached to said batten 108, passing over a guide pulley 110 and wound in a drum 111 driven by an electric motor 112. There are therefore provided two lateral cables 109 and two drums 111 for winding on the two lateral cables 109 which are coupled to the same transverse shaft 113 driven by the same motor 112. The lateral cables 109 and the motor 112 are designed to allow the curtain 100 to be retracted between the rails 102, i.e. to be displaced towards the downstream section 118 and the upper section 119 of the rails 102.

In addition, the first batten 108 is provided with at least one hook 114 (two hooks 114 in the embodiment shown) projecting downwardly from its end edge 115 so as to be able to engage in a corresponding catching opening 116 fixed to the downstream end edge 117 of the movable table 20 when the hook 114 is positioned above the opening 116 and the gripping device 64 is lowered in the gantry 61.

In this way, when the curtain 100 is retracted, the space between the rails 102, in their lower portion 120, is free and allows the objects of the layer which is to be grasped to pass between the pairs 88, 89 of jaws, which have moved apart during the descent of the gripping device 64 in order to grasp the layer resting on the layer-forming table 20. At the end of the descent each hook 114 engages in the opening 116 of the table 20. When the gripping device 64 is then moved horizontally with respect to the table 20 by activation of one and/or the other of the motors 24, 79, the curtain 100 is pulled in the rails 102 in the deployment direction by this relative displacement of the chassis 78 and the table 20. The table 20 slides under the objects held between the jaws 88*a*, 88*b*, 89*a*, 89*b* and is replaced by the curtain 100 which moves to support these objects.

In the second embodiment in which the layer-forming surface is formed by a conveyor 30, the deployment of the curtain 100 may preferably be effected not by the conveyor 30 but by another motor driving two further lateral cables associated with guide pulleys and drums, in the opposite direction to the lateral retraction cables 109 described above. This motor must be synchronized with the relative horizontal displacement of the conveyor 30 and the chassis 78 so that the curtain 100 is so deployed as to replace the belt 31 of the conveyor 30 to support the objects. It should be noted that this variant is not illustrated. In the variant of the second embodiment illustrated, the gripping device 64 is without a retractable base and comprises only a pair 89 of jaws 89*a*, 89*b*, the vertical faces of which are parallel to the axis 19 of the conveyor 30 and to the direction of horizontal translation of the chassis 78. There is also no reason why, as a variant or in combination, a pair 88 of jaws 88a, 88b perpendicular to the axis 19 of the conveyor 30 and to the direction of horizontal translation of the chassis 78 should not be provided.

Furthermore, the support structure 73 of the layer-stacking unit 60 advantageously includes a device 130 for re-centering and alignment by simultaneous clamping of the lateral faces 131 of the last stacked layer 132 of the palletized load which is to receive a following layer 133 transported by the gripping device 64.

The re-centering device 130 is advantageously activated immediately after placement of the layer 133 transported by the gripping device 64 so as to re-center and realign the objects of the last layer 132 which is to receive the transported layer 133.

The re-centering device 130 includes a rigid metal frame 134 the horizontal dimensions of which are greater than those of the largest palletized load to be formed. The rigid frame 134 is formed by U-section profiles forming guide rails for sliding skids or rollers journalled at each end of four movable bars 135, 136. Each movable bar 135, 136 extends respectively parallel to one side of the frame 134 and remains parallel to this side, its ends being guided in the two profiles orthogonal to this side. Each movable bar 135, 136 is moved by an actuator 137, 138 fixed along one of the profiles of the frame 134 orthogonal to the bar 135, 136. In the example shown, two orthogonal long-stroke actuators 137 are provided to displace the two bars 135 orthogonal to one another with a long horizontal clamping travel. The two other actuators 138 displacing the two other bars 136 have a shorter stroke and serve to control the reference corner formed between these bars 136 so that it corresponds to the reference corner for positioning the palletized load on the zone 86, i.e. so that it is plumb with respect to this reference corner. The long-stroke actuators 137 serve to clamp the sides 131 of the last layer 132. The actuators 137, 138 are controlled by the control unit 14. The movable bars 135, 136 are preferably provided with rollers 139 running on the sides 131 of the objects of the layer 133 when the gripping device 64 is then lowered to place the transported layer 133 on the last layer 132.

The frame 134 carries a photoelectric cell 139 designed to register the upper face of the last stacked layer when the support structure 73 is raised again after the placement of this last stacked layer. When the photoelectric cell 139 detects the transiting of this upper face, the value of the encoder 77 measuring the height of the support structure 73, and therefore that of the gripping device 64, is recorded by the control unit 14. When it is in position above the palletized load, the gripping device 64 extends above the re-centering device 130.

The frame 134 is suspended below the side rails 62, 63 in such a way that as that the gripping device 64 is lowered towards the palletized load in order to put down the transported layer 133, when the retractable base 100 and/or the lower face of the objects of the transported layer 133 arrive/s a few centimeters above the upper face of the objects of the last stacked layer 132, the movable bars 135, 136 of the re-centering device 130 move opposite the sides 131 of the last stacked layer 132. The re-centering actuators 137 are then activated and, if applicable, the base 100 is then retracted by activation of the retraction motor 112. The gripping device 64 is then lowered until the objects of the transported layer 133 rest on the upper face of the last stacked layer 132, i.e. as far as the value of the encoder 77 previously recorded. The actuators 92, 93 are then activated to withdraw the gripping jaws 88a, 88b and/or 89a, 89b and release the objects of the transported layer 133. The actuators 137 are also activated to move away the movable bars 135, 136, and the support structure 73 with the gripping device 64 and the re-centering device are raised. During this raising movement the cell 139 detects the height of the upper face of the last layer 133 thus stacked on the palletized load as indicated above.

The control unit 14 is programmed to implement the displacement sequences effected by the various drive elements (actuators or electric motors) according to the signals received from the encoders, sensors and photoelectric cells.

In particular, there is provided a program determining the operation of the orientation station 4, a program determining the operation of the transfer device 40, a program determining the operation of the layer-forming surface 20, 30 and a program determining the operation of the layer-stacking unit 60. These programs are advantageously independent, but are called up and supervised by a main synchronization program.

Each program is configured according to the shape and/or type and/or dimensions of the objects and/or of each layer and/or of the palletized load by a simple table of values to be acquired by the different encoders, which allow the different displacements to be easily varied, taking account of these variations of shape, type (for example, the manner of grouping objects) and dimensions.

FIGS. 6a to 6f show different successive steps of an example of an application of the first embodiment of the invention (movable layer-forming table 20) for a palletized load comprising seven cases C1 to C7 in each layer, with an empty central space 145 between them. The cases C1 to C4 have a smaller format than the cases C5 to C7. Table I below gives an example of a table of pivot angle values implemented for each case C1 to C7 of a layer by the orientation station 4. Table II below gives an example of a table of values of the encoder 54 of the thruster 47 for each movement of the thruster 47 in transferring the cases C1 to C7. When the value is 9999 the thruster 47 is held immobile (motor 51 not activated). Table III below gives an example of a table of values of the encoder 25 of the movable table 20 for each transfer of cases C1 to C7, the value 9999 corresponding to immobilization of the movable table 20 (motor 24 not activated).

These tables of values are stored in the control unit 14 to program the machine for the cases and layers of the example shown. After each movement the program moves to the next state in accordance with the table of values. In each table of values, the eighth state corresponds to re-setting the program to the initial state for processing of the following layer.

TABLE I

TABLE OF PIVOT ANGLE VALUES AT THE ORIENTATION STATION 4

| | FIGS. 6a to 6f | | | FIGS. 10a to 10e | |
|---|---|---|---|---|---|
| STATE | VALUE | FIG. | STATE | VALUE | FIG. |
| 1 | +90° | 6e | 1 | +90° | 10e |
| 2 | +90° | 6f | 2 | +90° | 10a |
| 3 | +90° | 6a | 3 | +90° | 10b |
| 4 | +90° | | 4 | 180° | 10c |
| 5 | −90° | 6b | 5 | 0° | 10d |
| 6 | 0° | 6c | 6 | — | |
| 7 | −90° | 6d | — | — | — |
| 8 | — | | | | |

TABLE II

TABLE OF VALUES OF THE ENCODER 54 OF THE THRUSTER 57

| FIGS. 6a to 6f | | | FIGS. 10a to 10e | | |
|---|---|---|---|---|---|
| STATE | VALUE | FIG. | STATE | VALUE | FIG. |
| 1 | 9999 | | 1 | 1220 | 10a |
| 2 | 1520 | 6a | 2 | 1220 | 10b |
| 3 | 9999 | | 3 | 1220 | 10c |
| 4 | 1520 | 6b | 4 | 780 | 10d |
| 5 | 780 | 6c | 5 | 780 | 10e |
| 6 | 780 | 6d | 6 | 0 | |
| 7 | 780 | 6e | — | — | — |
| 8 | 0 | 6f | | | |

TABLE III

TABLE OF VALUES OF THE ENCODER 25, 33 OF THE LAYER-FORMING SURFACE 20, 30

| FIGS. 6a to 6f (encoder 25 of table 20) | | | FIGS. 10a to 10e (encoder 35 of conveyor 30) | | |
|---|---|---|---|---|---|
| STATE | VALUE | FIG. | STATE | VALUE | FIG. |
| 1 | 2620 | | 1 | 9999 | 10a |
| 2 | 9999 | 6a | 2 | 1580 | 10b |
| 3 | 3260 | | 3 | 1160 | 10c |
| 4 | 9999 | 6b | 4 | 1360 | 10d |
| 5 | 9999 | 6c | 5 | 2000 | 10e |
| 6 | 2890 | 6d | 6 | 0 | |
| 7 | 2370 | 6e | — | — | — |
| 8 | 0 | 6f | | | |

Figure 6A:
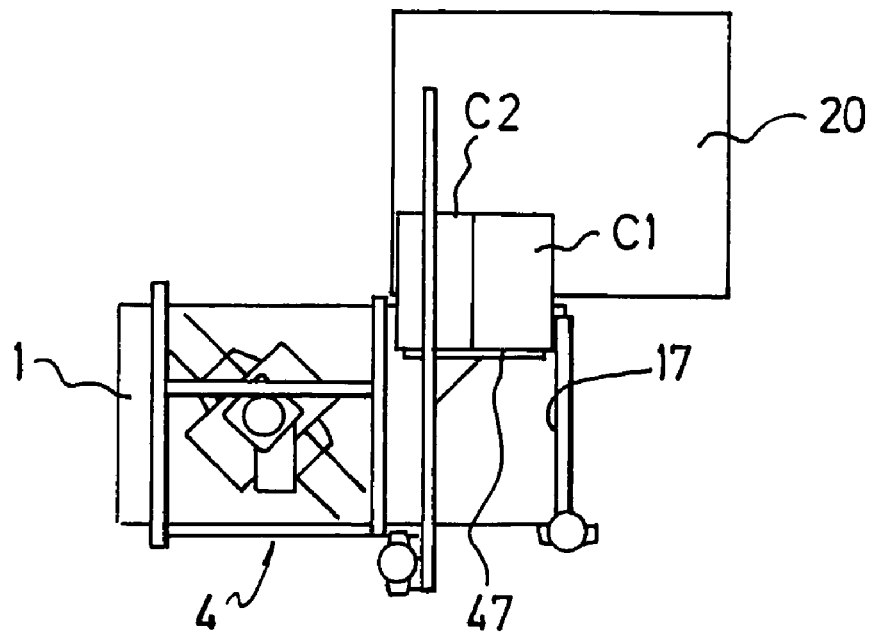
FIGS. 6a to 6f show schematically top views of different successive steps of a first example of forming a layer with a machine according to the first embodiment of the invention.

In FIG. 6a the two first cases C1, C2 have been placed in abutment against the reference stop 17 and are simultaneously transferred by the thruster 47, the movable table 20 being at the value 2620 of the encoder 25. The thruster 47 moves as far as the value 1520 of its encoder 54 to push the cases C1, C2 as far as the opposite edge of the movable table 20.

Figure 6B:
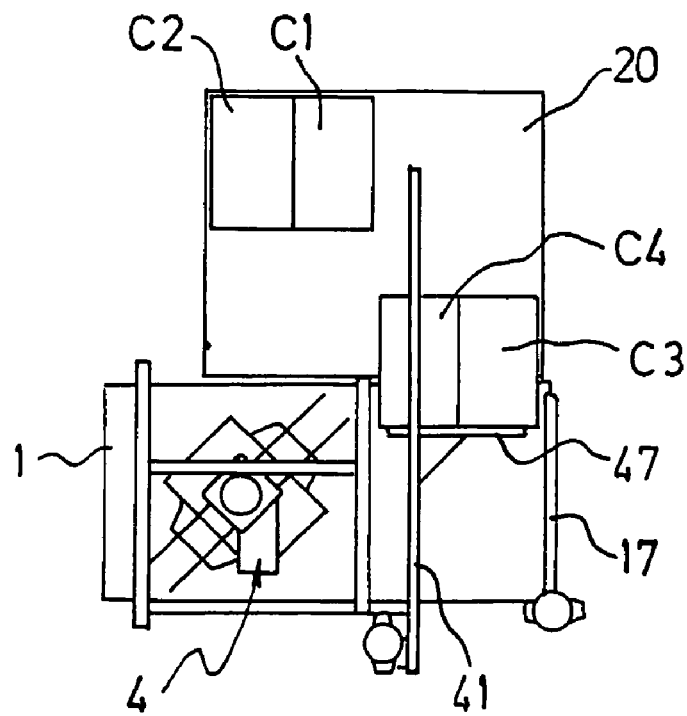

In FIG. 6b the two following cases C3, C4 are simultaneously transferred in continuity with the cases C1, C2, the movable table 20 having previously been moved to the value of 3260 of the encoder 25 (for state 3, corresponding to the moving of case C3 against the stop 17).

Figure 6C:
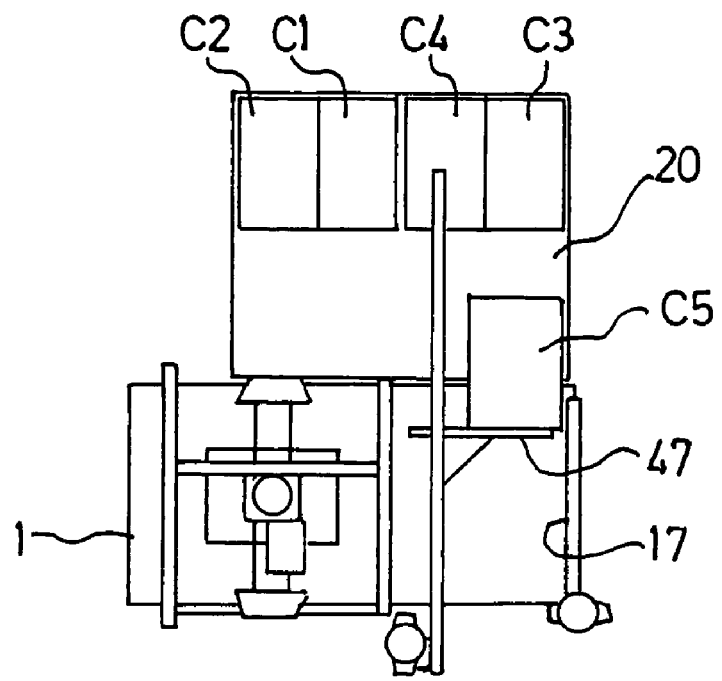

In FIG. 6c the case C5 is transferred by the thruster 47, which effects a displacement only as far as the value 780 of its encoder 54, the movable table 20 still being at the value 3260 of the encoder 25.

Figure 6D:
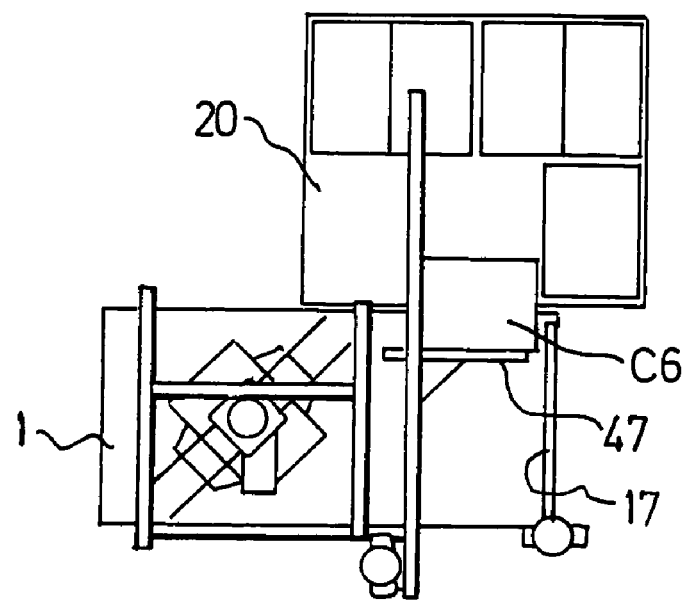

In FIG. 6d the following case C6 is transferred by the thruster 47, which effects a displacement as far as the value 780 of its encoder 54, the movable table 20 being positioned at the value 2890 of its encoder 25.

Figure 6E:
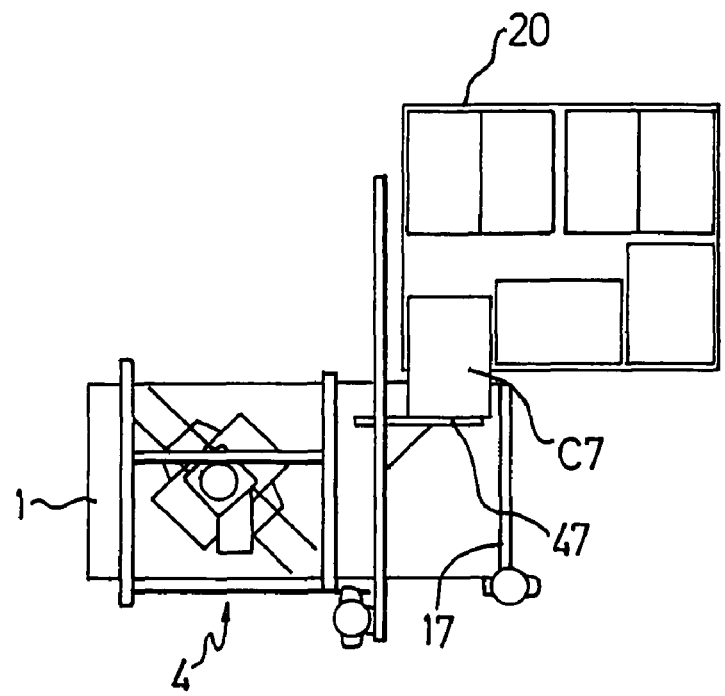

In FIG. 6e the following case C7 is transferred by the thruster 47, which effects a displacement as far as the value 780 of its encoder 54, the movable table 20 being positioned at the value 2370 of its encoder 25.

Figure 6F:
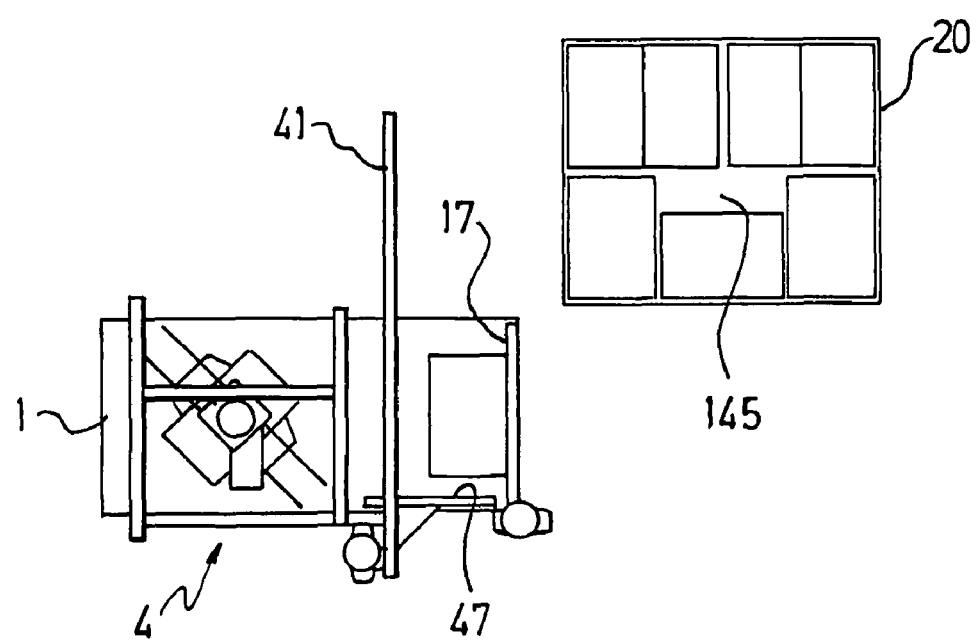

In FIG. 6f the layer formed on the movable table 20 is displaced by the movable table 20 as far as the most downstream position in which it can be grasped by the gripping device 64 of the layer-stacking unit 60. This position of the movable table 20 corresponds to the moving of the table 20 downstream into abutment (value 0 of the encoder 25). Upon this abutment the encoder 25 is reset to the reference value, equal to 1760 in the example given, to repeat the steps for a subsequent layer.

FIGS. 10a to 10e show different successive steps of another example of an application of the second embodiment of the invention (layer-forming conveyor 30) for a palletized load comprising five cases C'1 to C'5 of the same format. FIGS. 10a to 10e are similar to FIGS. 6a to 6f. Tables I to III also contain tables of corresponding values.

Figure 10A:
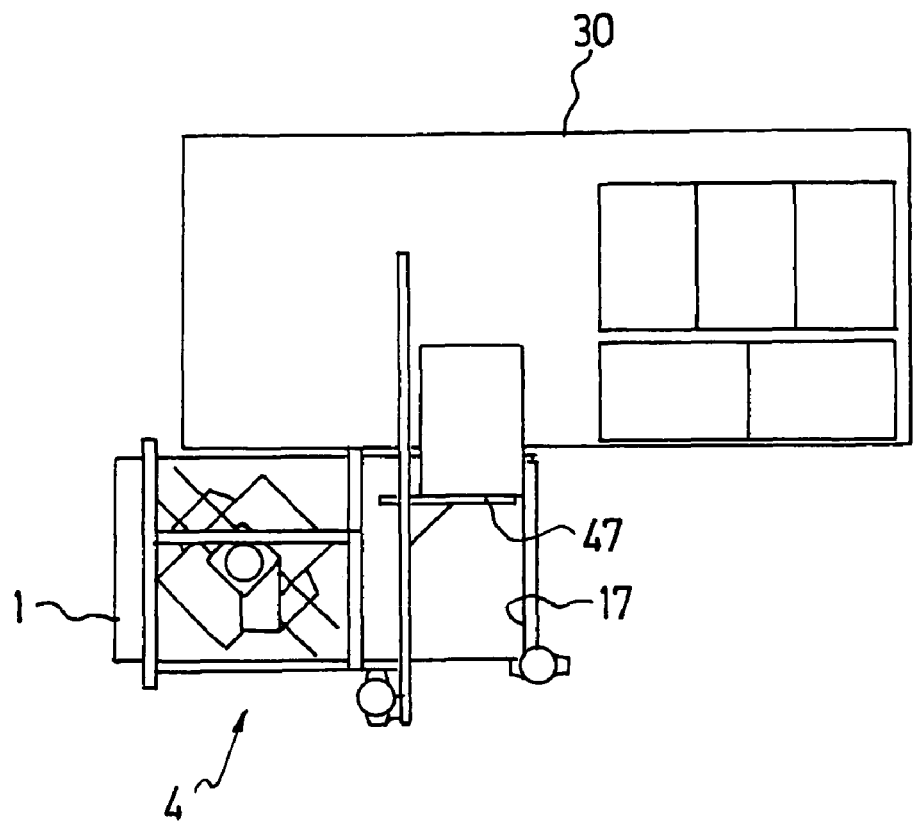
FIGS. 10a to 10e are schematic top views of different steps of a second example of layer formation with a machine according to the second embodiment of the invention.

At the start the encoder 33 of the conveyor 30 is reset to the value 2000. In FIG. 10a the first case C'1 located against the reference stop 17 is transferred by the thruster 47 which has been moved to the value 1220 of its encoder 54. The layer-forming conveyor 30 is held in position (initial value 2000 of the encoder 33). It should be noted that the layer previously formed is still located on the downstream section of the conveyor 30 and is being grasped by the gripping device 64 when the formation of a following stage has begun on the upstream section of the conveyor 30. The conveyor 30 therefore has the advantage of a faster layer-forming rate than the movable table 20.

Figure 10B:
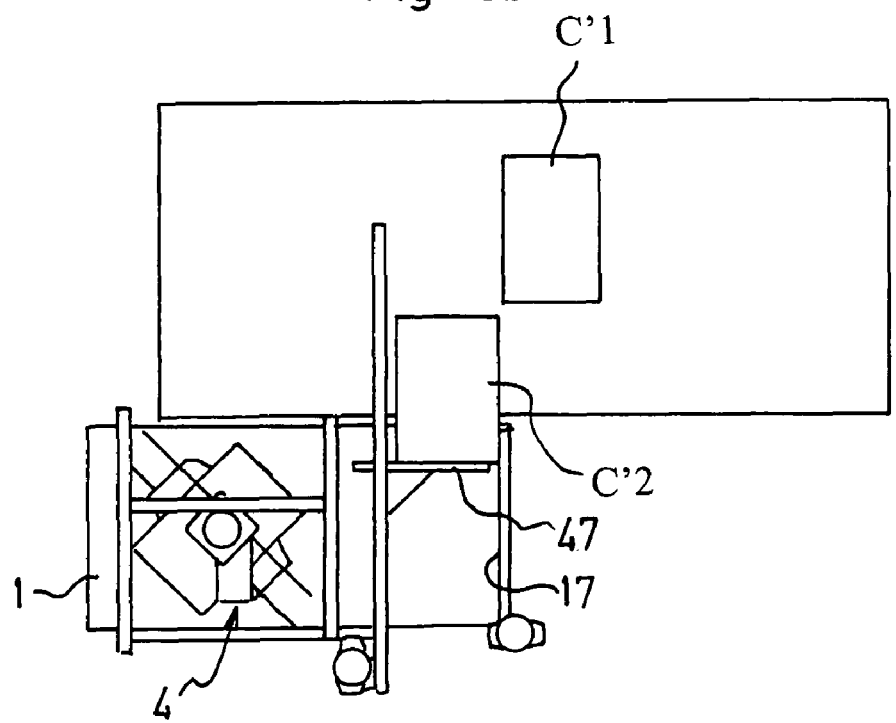

In FIG. 10b the conveyor 30 has been displaced downstream as far as the value 1580 of its encoder 33 for transfer of the second case C'2 by the thruster 47 until it contacts the case C'1 (value 1220 of the encoder 54).

Figure 10C:
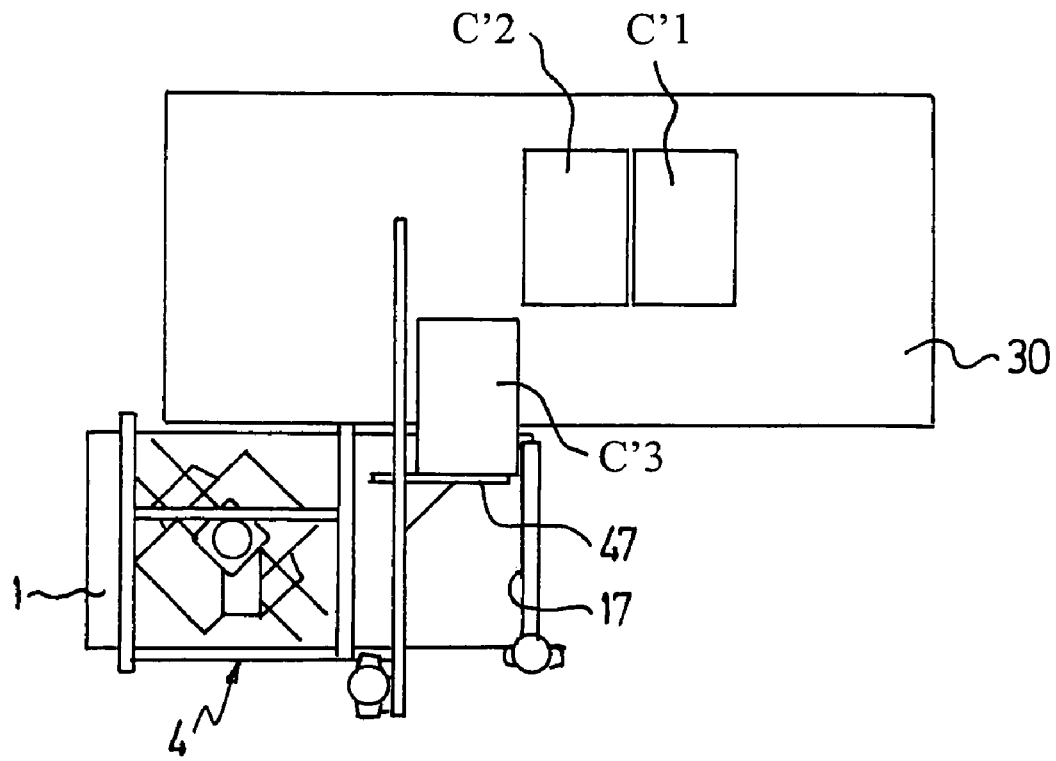

In FIG. 10c the case C'3 is transferred in a similar fashion to a position beside the case C'2, the conveyor 30 being displaced downstream to the value 1160 of its encoder 33.

Figure 10D:
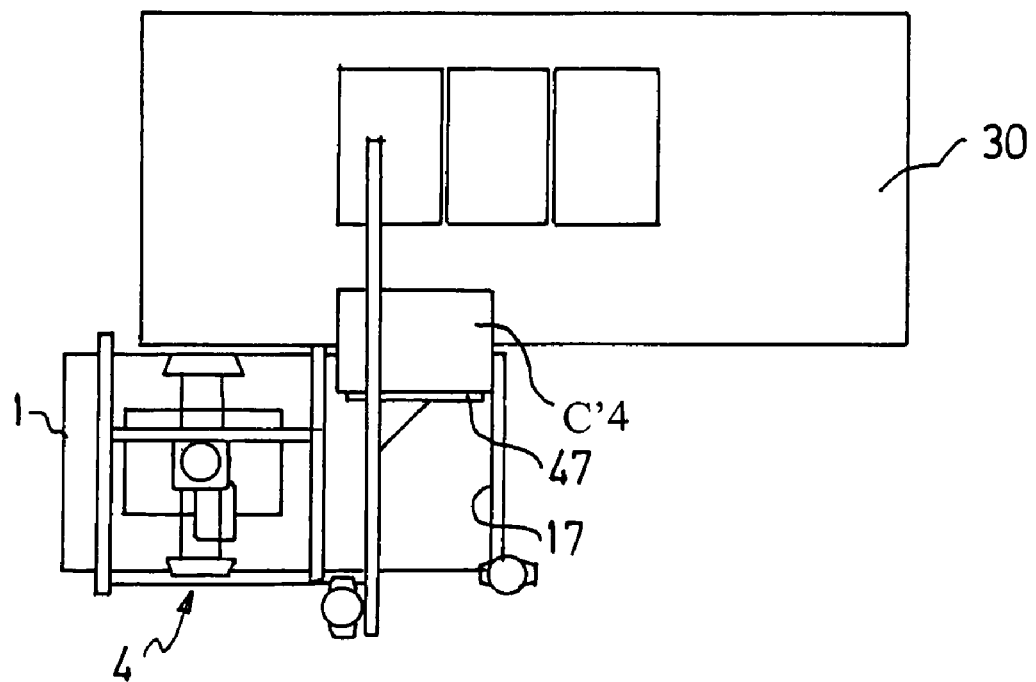

In FIG. 10d the case C'4 is transferred by displacement of the thruster 47 as far as the value 780 of its encoder 54, the conveyor 30 having been moved upstream as far as the value 1360 of its encoder 33.

Figure 10E:
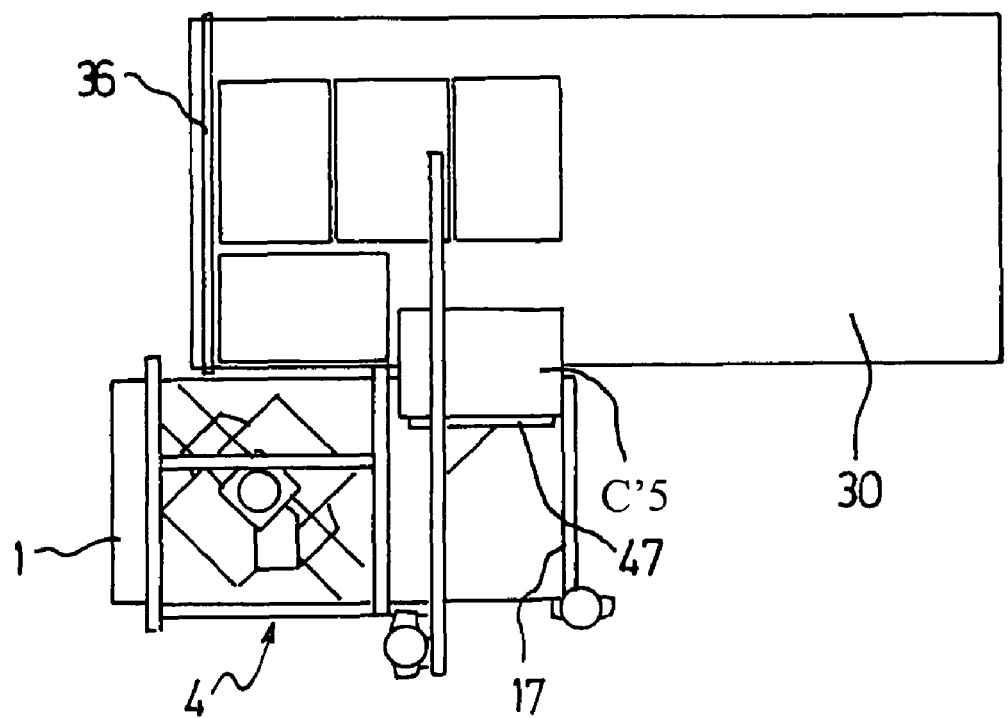

In FIG. 10e the case C'5 is transferred by displacement of the thruster 47 as far as the value 780 of its encoder 54, the conveyor 30 having been returned to its starting position at the value 2000 of its encoder 33.

In the two examples of layer-forming shown, it can be seen that the orientation station 4 is active on a following case, using the angle value mentioned in Table I, during the transfer of one or more cases on to the layer-forming surface 20, 30.

An example of successive stacking steps for the layer of objects previously formed on the table 20 by the layer-stacking unit 60 of the machine according to the first embodiment is shown in FIGS. 2 and 7a to 7e.

Figure 2:
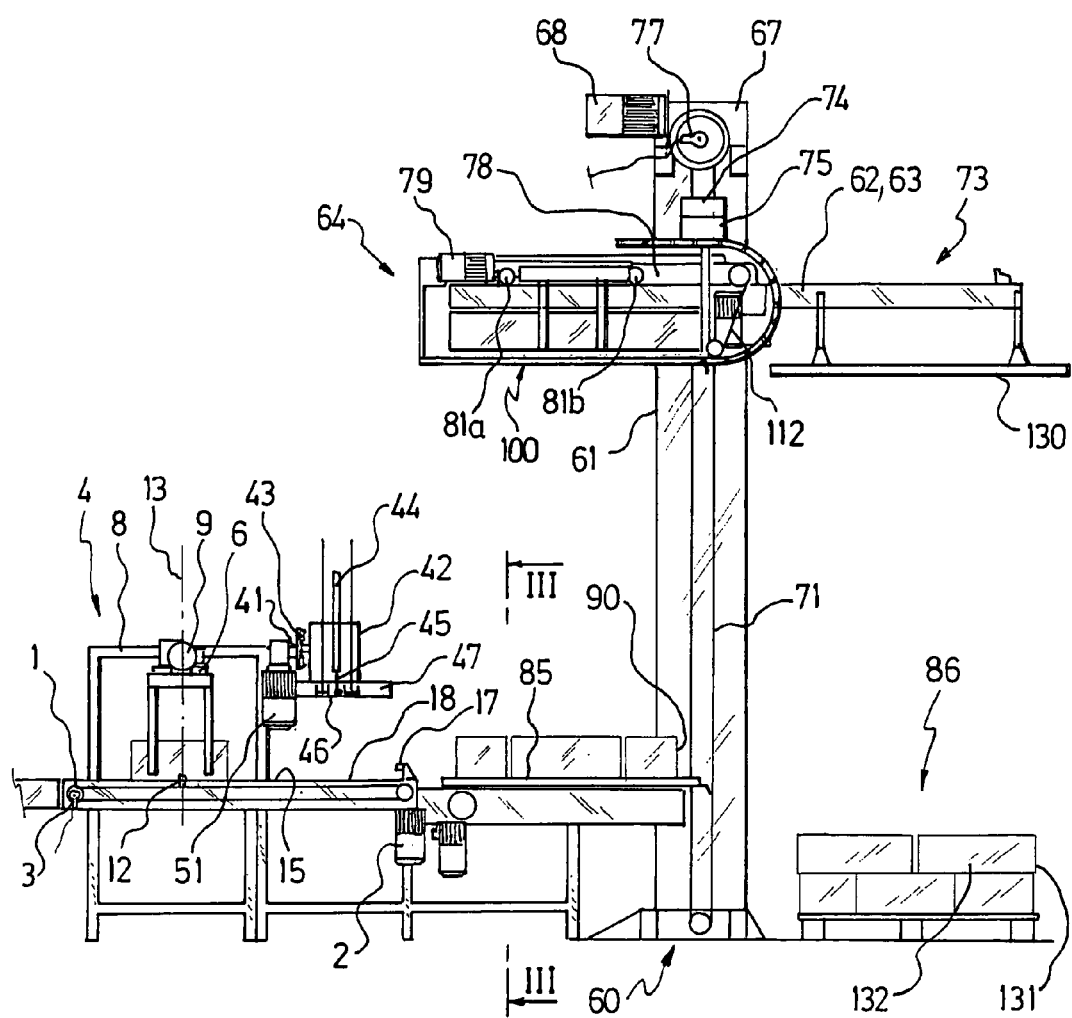
FIG. 2 is a schematic side view of the machine of FIG. 1.
Figure 3:
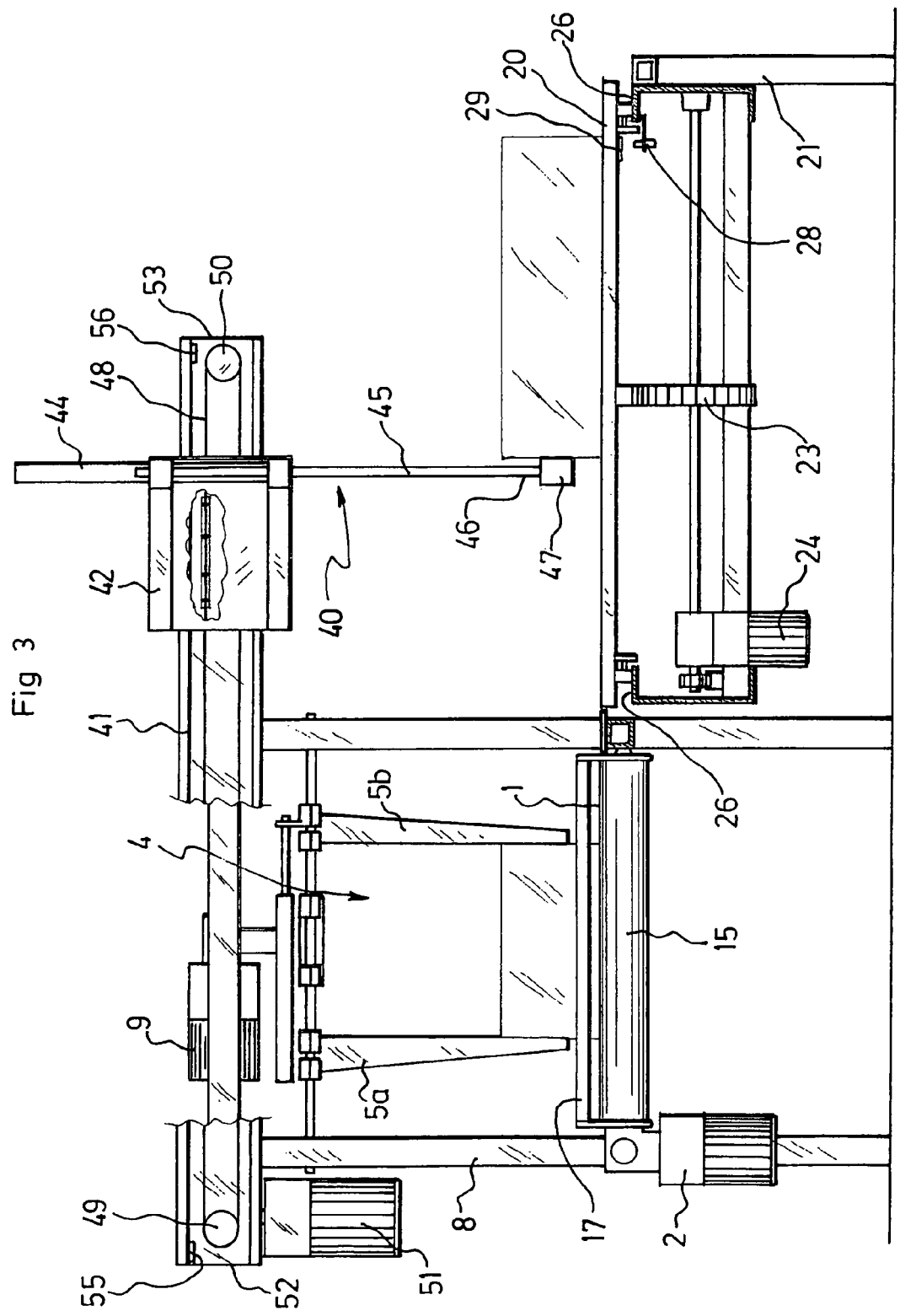
FIG. 3 is a schematic, sectional, partially cut-away view along the line III-III of FIG. 2.
Figure 4:
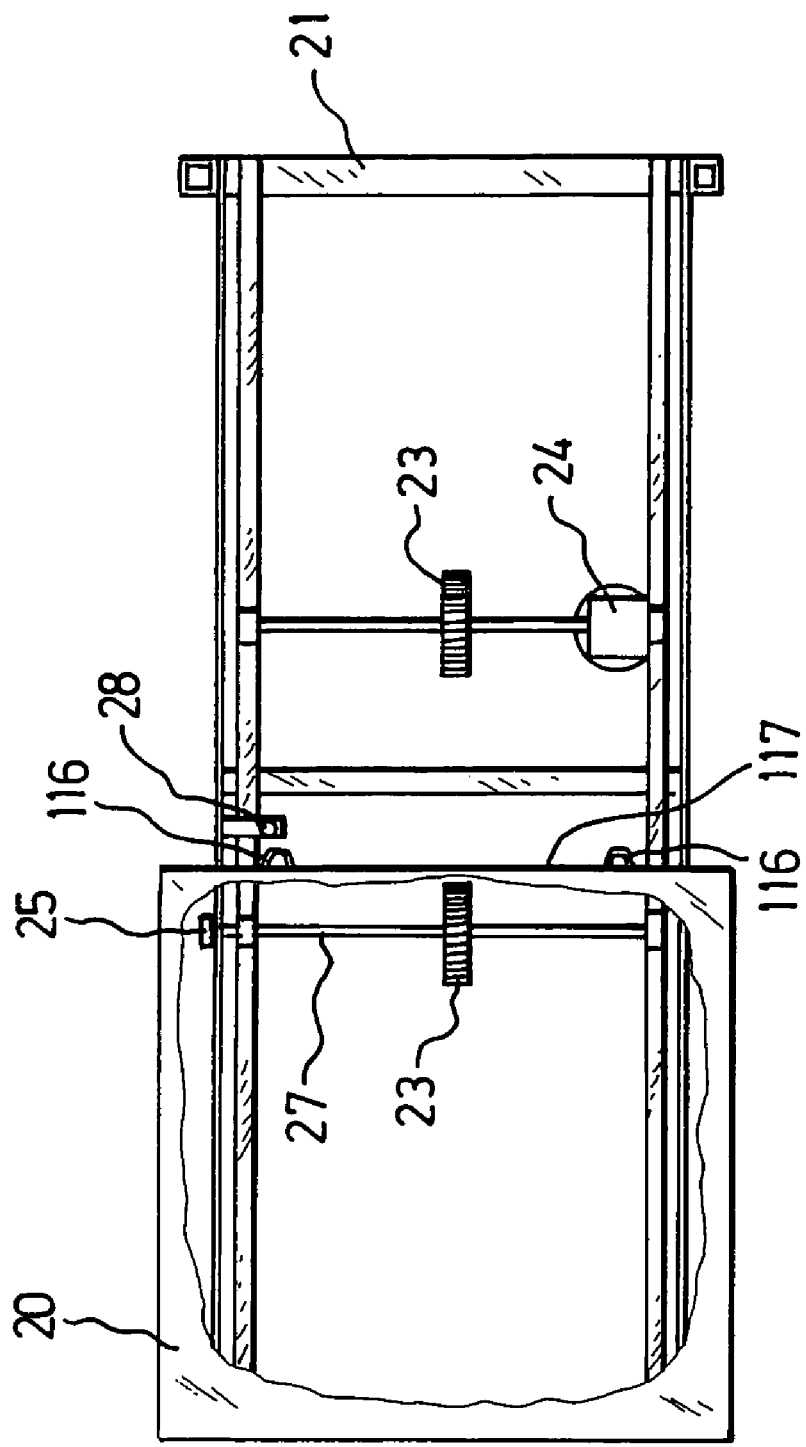
FIG. 4 is a schematic cut-away top view illustrating the guide mechanism of the layer-forming table of the machine of FIG. 1.
Figure 5:
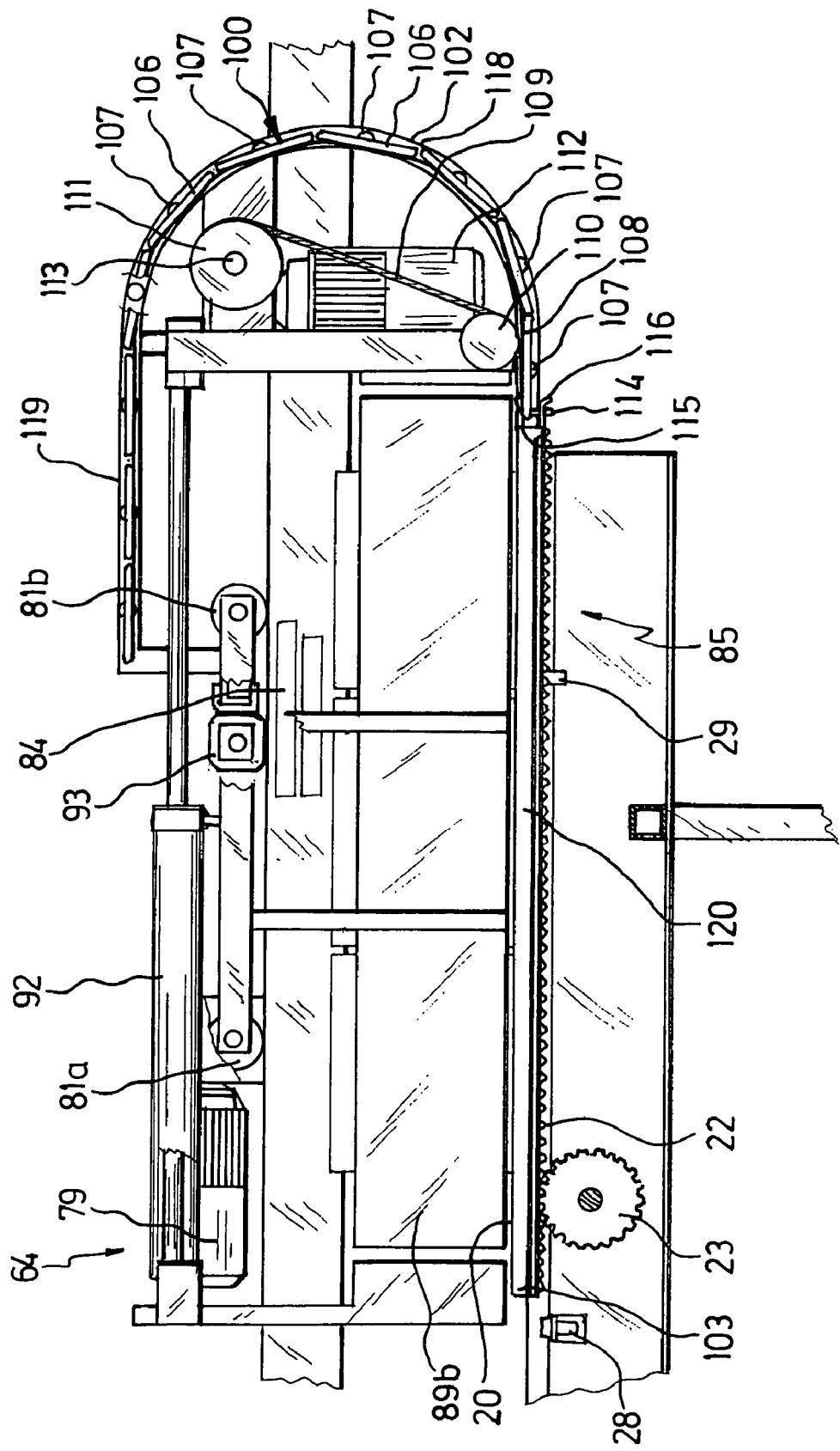
FIG. 5 is a schematic, partially cut-away side view illustrating in more detail the layer-gripping device with retractable base of the machine of FIG. 1.
Figure 7B:
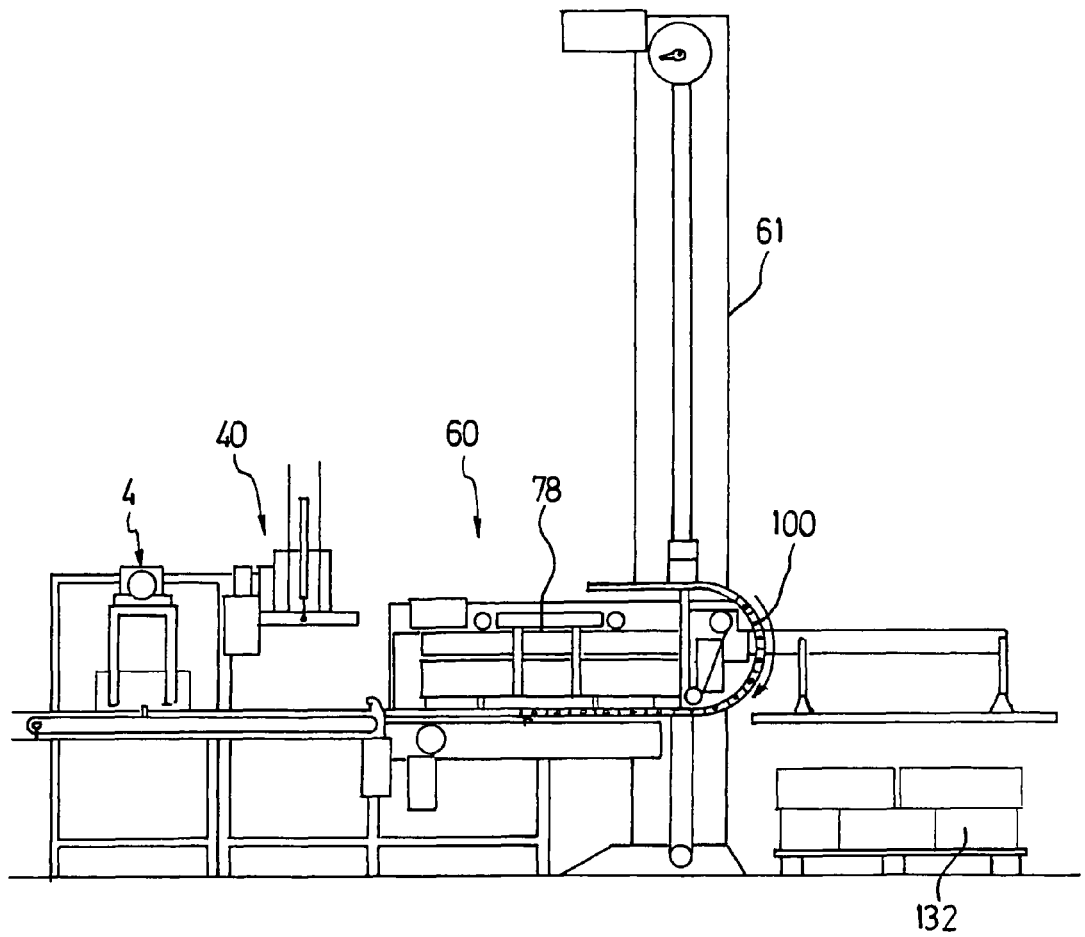
Figure 7C:
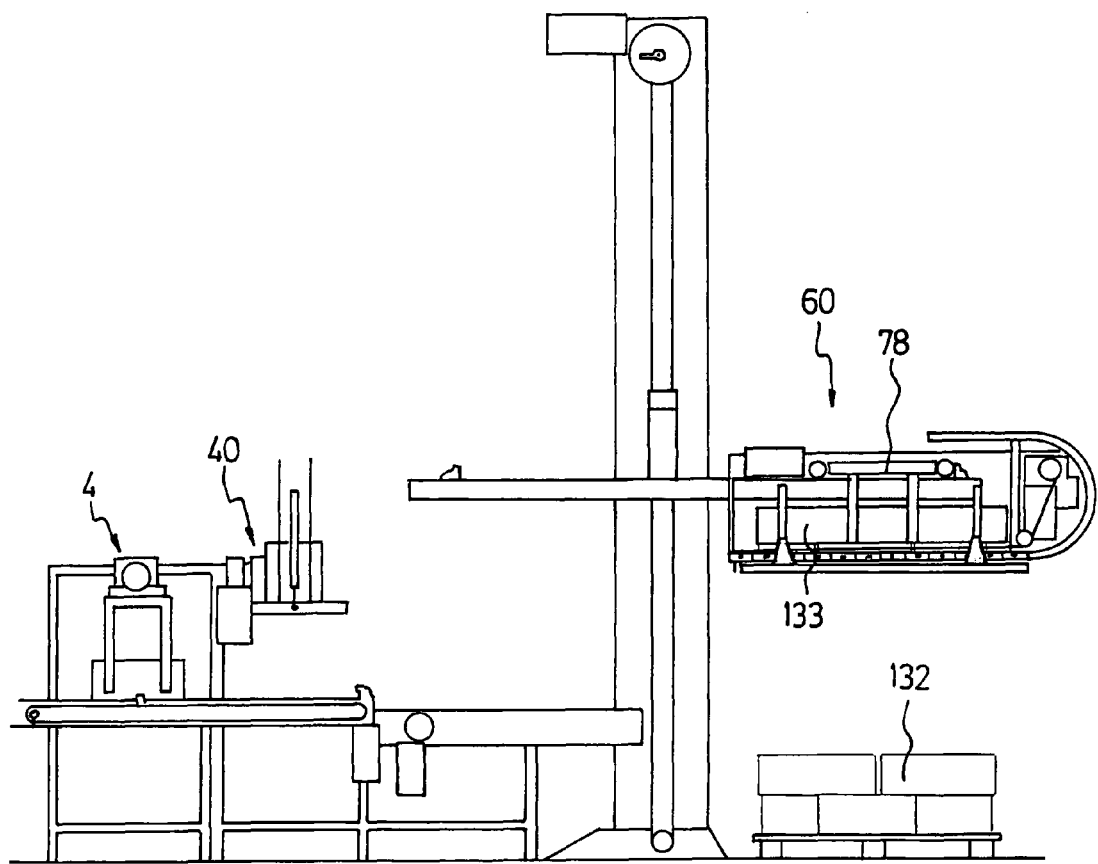

Initially, the support structure 73 and the layer-gripping device 64 are in the high position in the gantry 61, as shown in FIG. 2, for the formation of a layer on the table 20. The layer-gripping device 64 is then lowered with the support structure 73 by activating the motor 68 until it arrives level with the table 20, the curtain 100 being in the retracted position and the grippers 88, 89 being moved apart, so that the objects of the layer are located between the grippers 88, 89 (FIG. 7a). The hooks 114 of the curtain 100 engage in the openings 116 of the table 20 as shown in FIG. 5. The table 20 is then displaced horizontally by activation of its motor 24, which has the effect of deploying the curtain 100 below the objects (FIG. 7b).

The grippers 88, 89 are clamped and the motor 68 is again activated to raise the support structure 73 and the layer-gripping device 64 to a height above that of the last layer 132 of the palletized load. The layer-gripping device 64 is then displaced in horizontal translation on the side rails 62, 63 by activation of the motor 79 to move above the palletized load at the position shown in FIG. 7c.

Figure 7D:
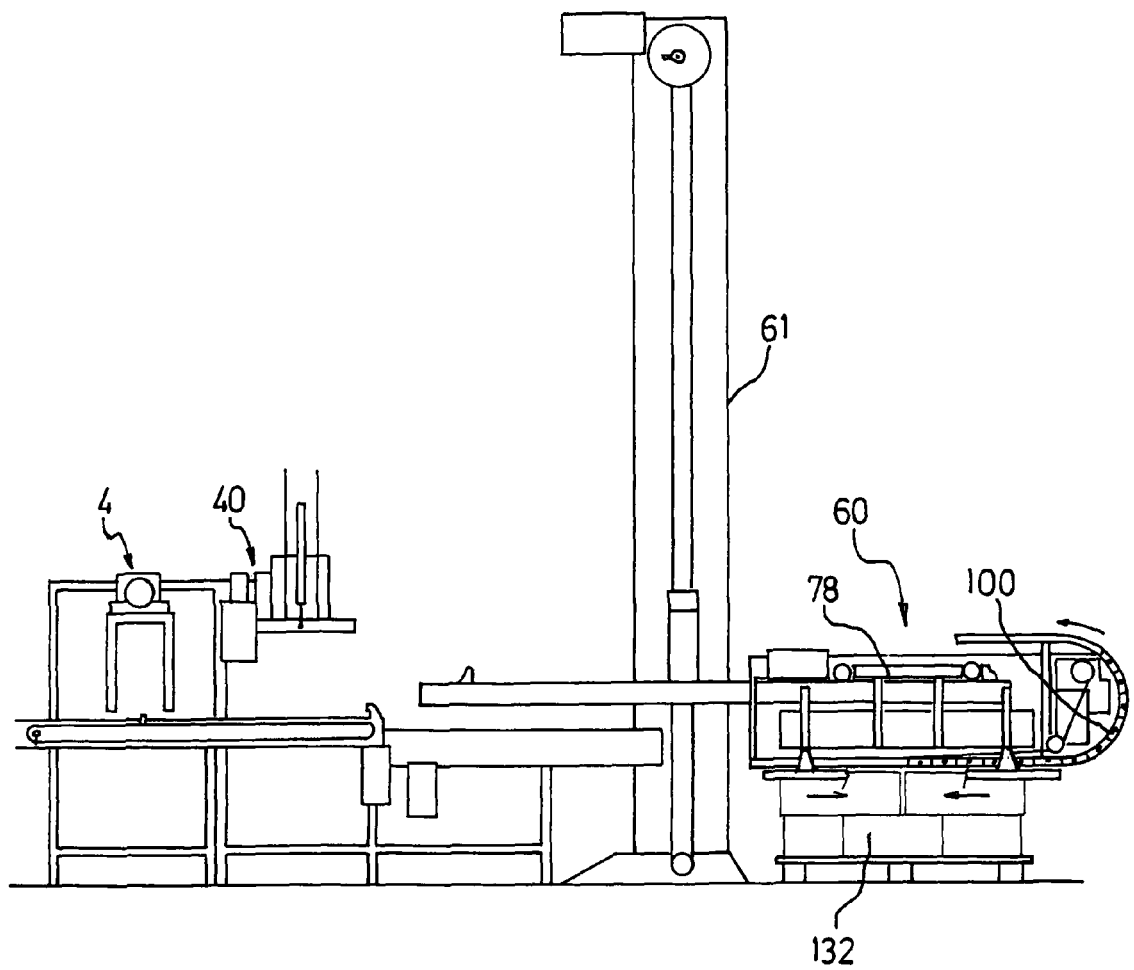
Figure 7E:
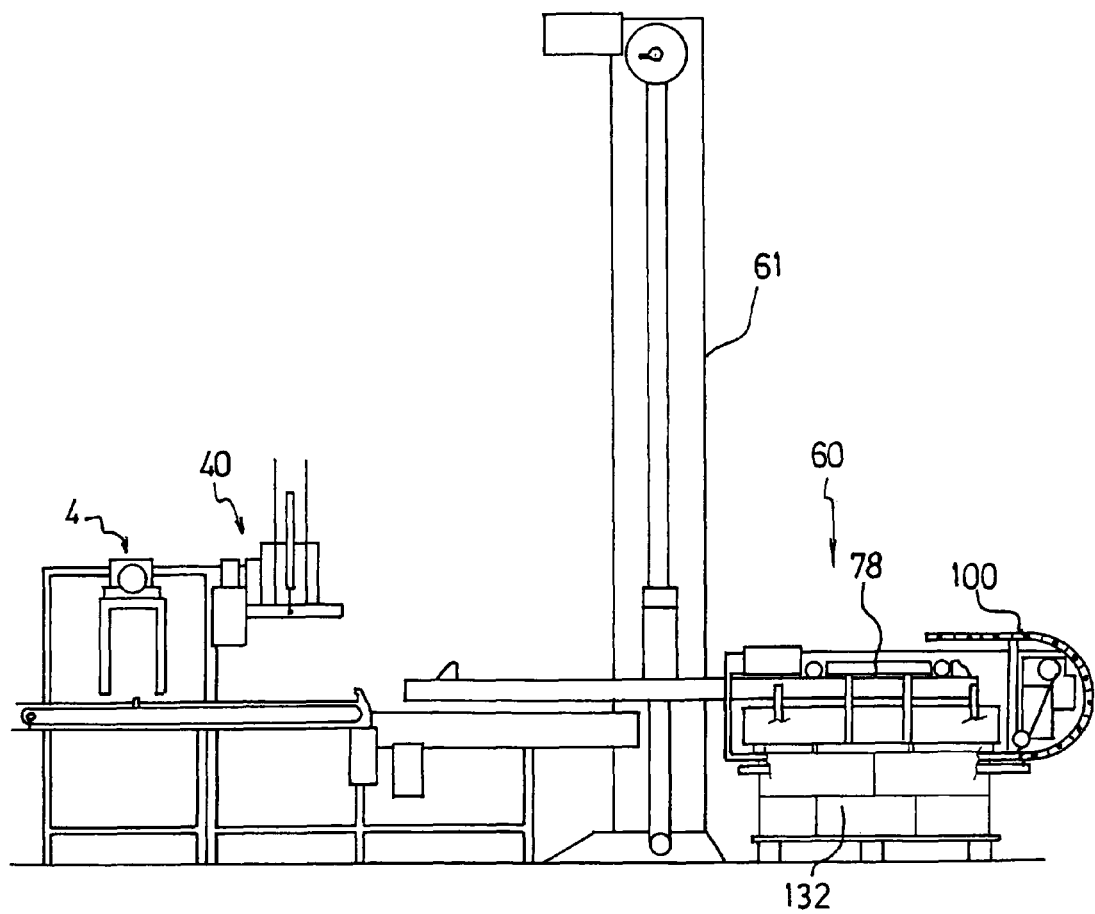
Figure 8:
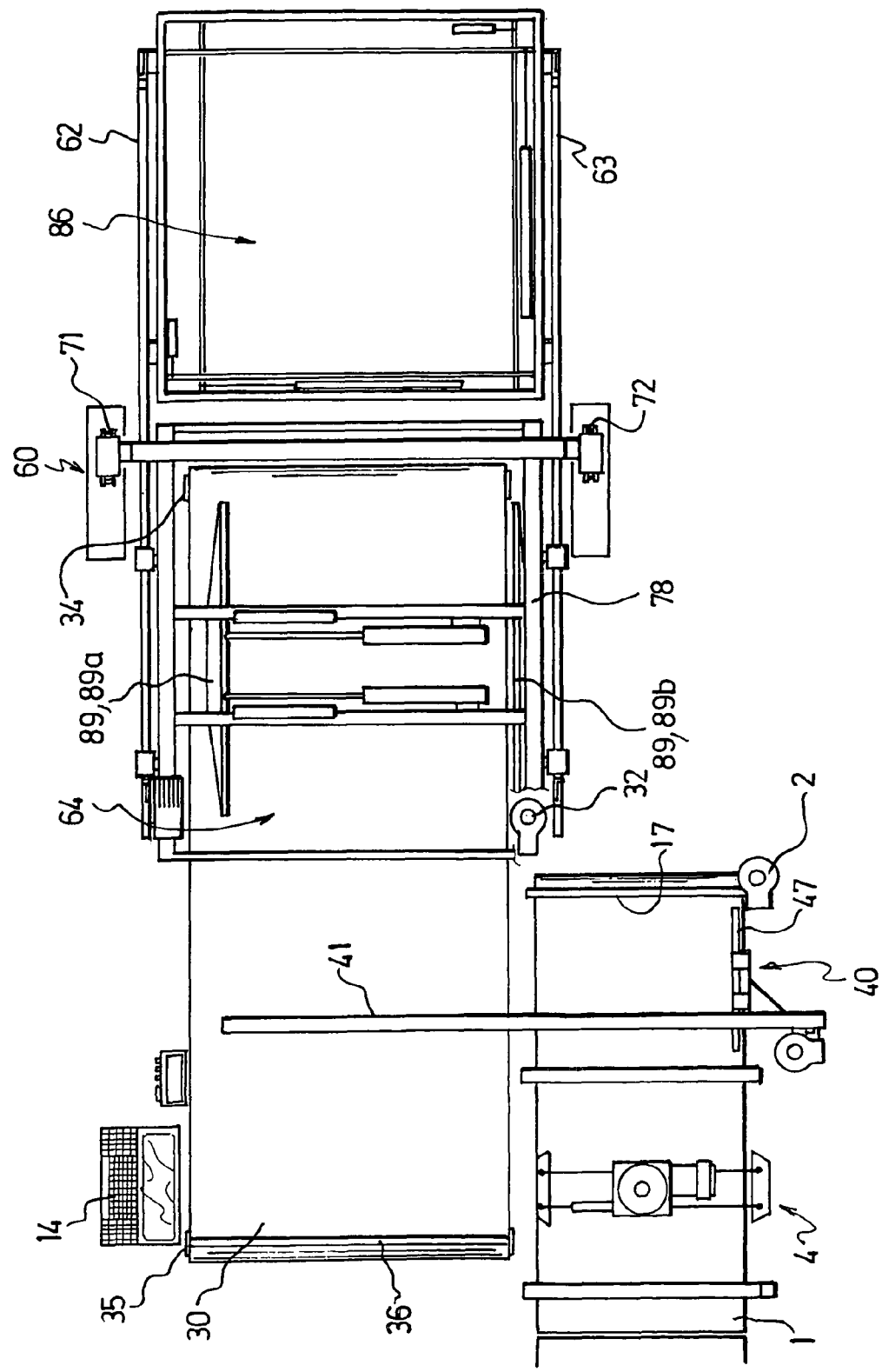
FIG. 8 is a schematic top view similar to FIG. 1 showing a second embodiment of the invention.

The motor 68 is then activated to move the layer gripping device 64 and the support structure 73 down again until the re-centering device 130 is opposite the sides 131 of the last stacked layer 132, and is activated as shown in FIG. 7d and described previously. The curtain 100 is then retracted by activating the motor 112 (FIG. 7d), then the motor 68 is again activated to move down and put down the transported layer 133 on the last stacked layer 132 as described previously and as shown in FIG. 7e. The device 64 is then returned to its initial position (FIG. 2).

FIGS. 9, 11a to 11c show in a similar manner different successive steps in the stacking of a layer of objects previously formed on the conveyor 30 by the layer-stacking unit 60 of the machine according to the second embodiment.

It should be noted that in the variant in which the layer-gripping device 64 includes only one pair 89 of jaws, after a layer has been formed on the conveyor 30 the latter is moved by activation of the motor 32 until the layer abuts the upstream transverse stop 36, so that the objects are accumulated against one another in the longitudinal direction 19. Then the motor 32 is reversed to move the layer to the opposite, downstream end 85 of the conveyor 30 so that it can be grasped by the gripping device 64.

Initially, the layer-gripping device 64 is in the raised position shown in FIG. 9 during the formation of the layer on the conveyor 30. It is lowered towards the conveyor 30 to grasp the layer formed by activation of the grippers 89a, 89b, as shown in a FIG. 11a.

Figure 11A:
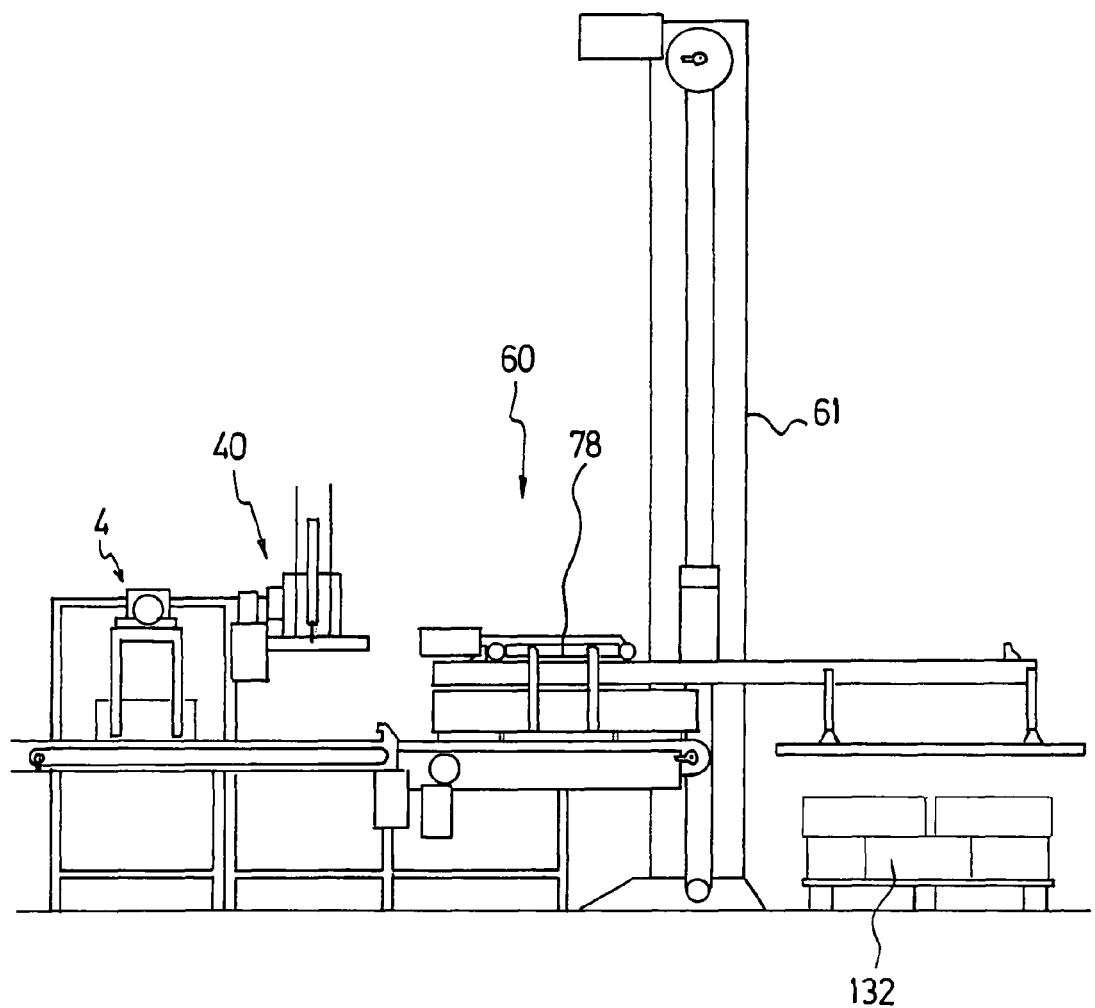
FIG. 11a to 11c are schematic side views showing different successive steps of transferring a layer by the layer-stacking unit from the layer-forming conveyor to the palletized load being formed, with a machine according to the second embodiment of the invention.
Figure 11B:
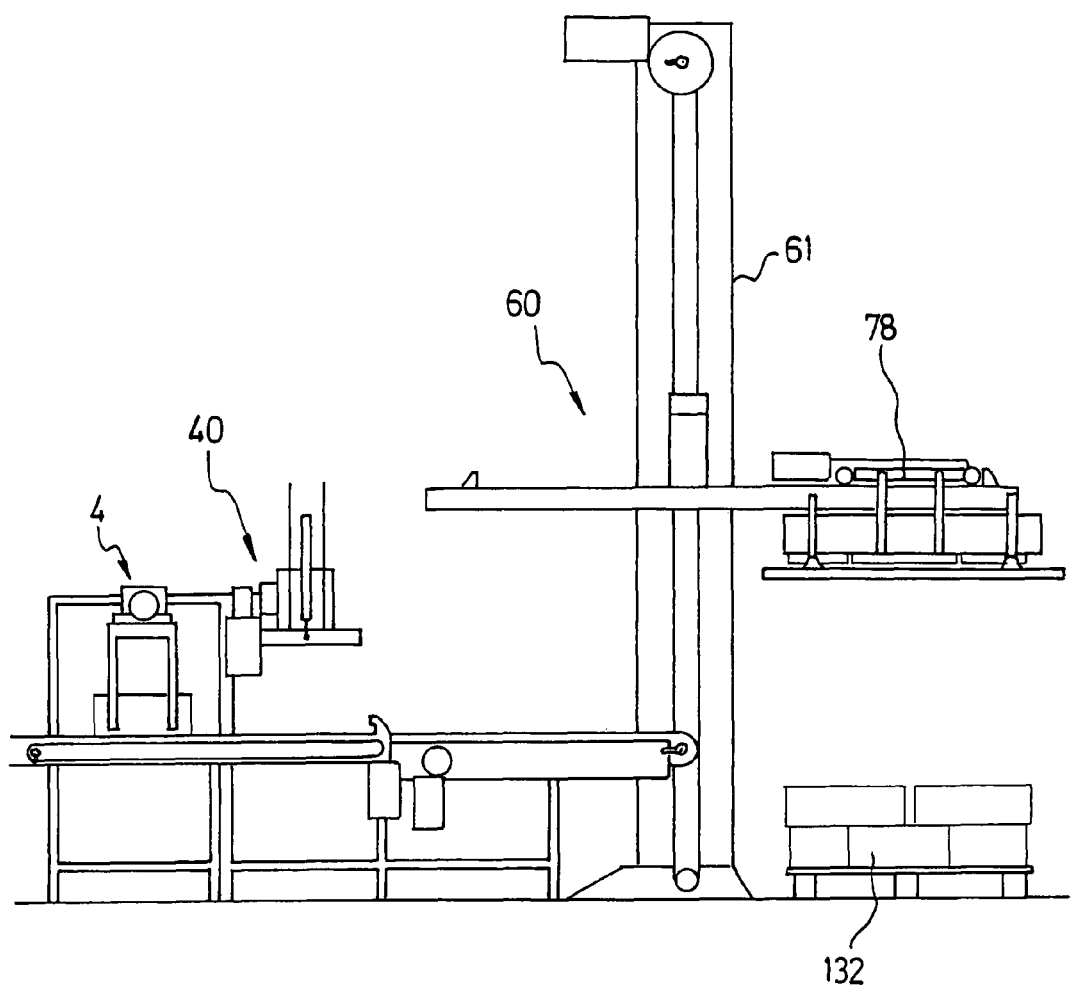

FIG. 11b shows the next step, in which the layer-gripping device 64 has been raised and moved horizontally above the palletized load.

Figure 11C:
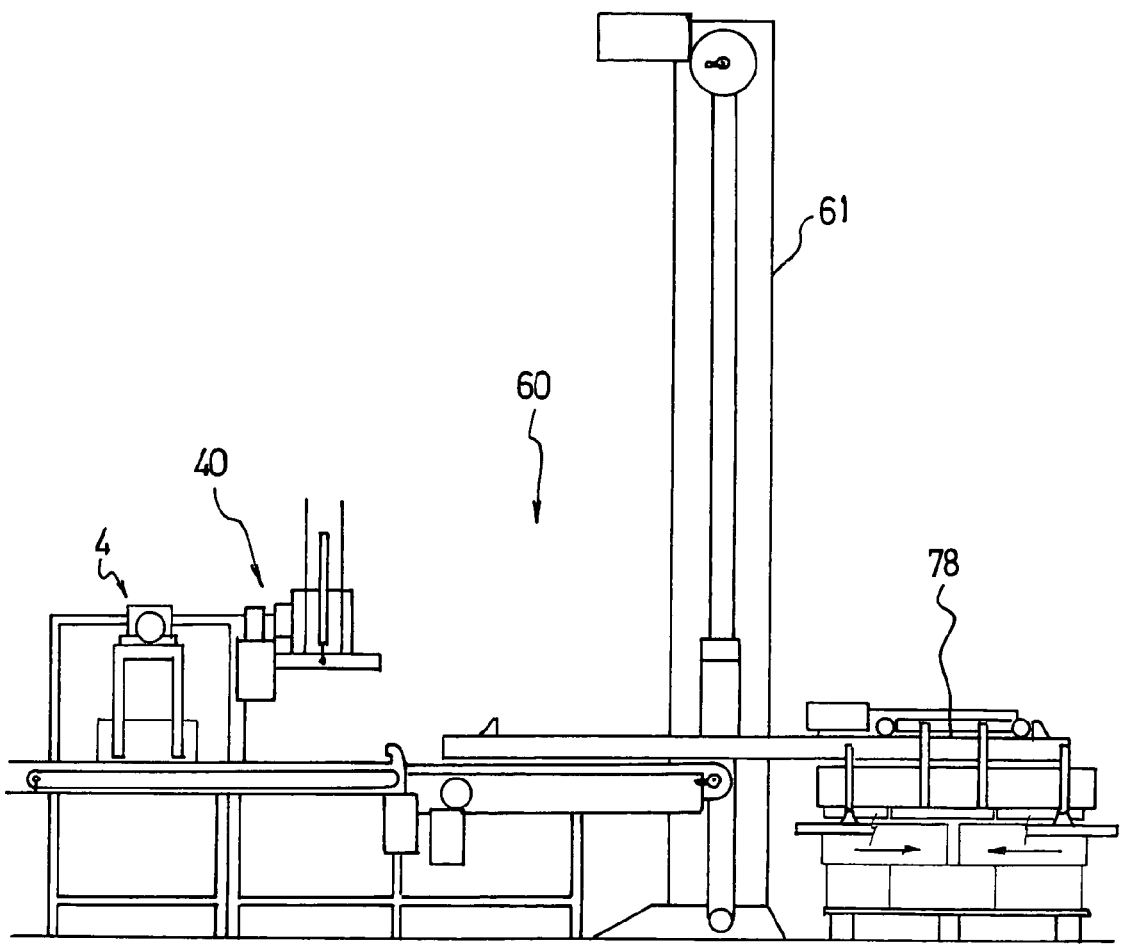

FIG. 11c shows the following step in which the layer-gripping device 64 has been lowered to place the transported layer 133 on the last stacked layer 132, which has been re-centered by the re-centering device 130. The grippers 89a, 89b are then moved apart and the layer-gripping device 64 is returned to its starting position.

The invention may provide variants other than those described and illustrated in the Figures. It is advantageously applicable to the forming of palletized loads with the aid of cases, baskets or small boxes of fruit. It is also applicable to other types of objects and of palletized loads.

The invention claimed is:

1. A machine for palletizing substantially parallelepipedic objects, comprising:
    at least one conveyor for feeding objects successively one by one,
    a station for orienting each object in a horizontal plane with respect to a fixed horizontal direction,
    a grouping station for forming objects into a group able to form a layer of a palletized load comprising a stack of layers of objects, the grouping station being adapted to place each object supplied by the feed conveyor in a position that it is to occupy in the forming of a layer;
    a layer-stacking unit adapted to grasp and transport in a single block each layer previously formed at the grouping station on to a palletized load in the course of being formed by a stacking of layers,
        wherein the grouping station comprises:
    a reference stop, firmly mounted to a fixed structure and adapted to stop an object in a horizontal transverse abutment direction,
    an abutment conveyor for placing an object to be positioned in abutment against the reference stop,
    a layer-forming surface extending laterally opposite the reference stop, said layer-forming surface being movable in horizontal translation along an axis orthogonal to the direction of the reference stop under the effect of a driving device,
    a motorized thruster adapted to displace the object located against the reference stop onto a predetermined zone of the layer-forming surface corresponding to the position the object is to occupy in the layer in the course of formation,
    an automatic control system adapted to control said driving device so as to position laterally opposite the reference stop a zone of the layer-forming surface which is to receive the object located against the reference stop, and to control the thruster so that said object is displaced to said zone of the layer-forming surface.

2. A machine as claimed in the claim 1, wherein the layer-forming surface comprises a table mounted on a fixed structure for movement in horizontal translation in one direction or the other and to be maintained in a fixed position after having been displaced.

3. A machine as claimed in claim 1, wherein the layer-forming surface comprises an endless belt conveyor movable in horizontal translation.

4. A machine as claimed in claim 1, wherein the layer-forming surface extends horizontally at least substantially at the height of the abutment conveyor, and wherein the motorized thruster is mounted to be movable in horizontal translation with respect to the fixed structure parallel to the direction of the reference stop.

5. A machine as claimed in claim 1, wherein the thruster is carried and guided by a slide extending above the abutment conveyor and the layer-forming surface, at a height greater than that of the objects.

6. A machine as claimed in claim 1, wherein the automatic control system controls the thruster in such a way that the latter pushes a plurality of objects located in abutment against one another against the reference stop.

7. A machine as claimed in claim 1, wherein the thruster displaces simultaneously a number of objects smaller than that of a row of a layer of the palletized load.

8. A machine as claimed in claim 1, wherein the orientation station includes a gripper adapted to grasp each object by two opposed vertical faces of the object and to pivot the object on itself about a vertical access so as to subject the object, once grasped by the gripper, to a rotation through an angle equal to a multiple of 90° in one direction or the other.

9. A machine as claimed in claim 8, wherein the gripper is mounted on a support arranged above the feed conveyor at a height greater than that of the objects, and has two opposed jaws which are spaced apart at rest, before grasping an object, by a distance greater than the largest horizontal dimension of the objects.

10. A machine as claimed in claim 1, wherein the layer-stacking unit includes a device for gripping in one block a layer previously formed on the layer-forming surface, and means for displacing the gripping device in vertical translation in order to raise/lower a layer, and in horizontal translation in order to transport the layer held by the gripping device from the layer-forming surface until it is plumb with respect to a pallet or a palletized load in the course of formation.

11. A machine as claimed in claim 1, wherein the layer-stacking unit also includes a device for re-centering and alignment by simultaneous clamping of the sides of the last stacked layer of the palletized load which is to receive the transported layer.

* * * * *